United States Patent
Harada et al.

(10) Patent No.: US 10,779,316 B2
(45) Date of Patent: Sep. 15, 2020

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/089,152

(22) PCT Filed: Mar. 30, 2017

(86) PCT No.: PCT/JP2017/013300
§ 371 (c)(1),
(2) Date: Sep. 27, 2018

(87) PCT Pub. No.: WO2017/170887
PCT Pub. Date: Oct. 5, 2017

(65) Prior Publication Data
US 2019/0124678 A1    Apr. 25, 2019

(30) Foreign Application Priority Data
Mar. 31, 2016    (JP) .................................. 2016-073411

(51) Int. Cl.
*H04W 56/00*    (2009.01)
*H04W 72/12*    (2009.01)
(Continued)

(52) U.S. Cl.
CPC ....... *H04W 72/1289* (2013.01); *H04L 1/1614* (2013.01); *H04L 5/005* (2013.01);
(Continued)

(58) Field of Classification Search
CPC ............. H04W 72/1289; H04W 16/14; H04W 72/042; H04W 72/0446; H04W 72/0453;
(Continued)

(56) References Cited

U.S. PATENT DOCUMENTS

| 2015/0208435 A1* | 7/2015 | Zhu | H04W 72/1289 |
| | | | 370/280 |
| 2016/0007310 A1* | 1/2016 | Yi | H04W 56/0015 |
| | | | 370/338 |

(Continued)

FOREIGN PATENT DOCUMENTS

JP    2015179994 A    10/2015

OTHER PUBLICATIONS

Ericsson; "Uplink Resource Allocation Design for Enhanced LAA"; 3GPP TSG-RAN WG1 #84 R1-160994; St Julian's, Malta, Feb. 15-19, 2016 (3 pages).
(Continued)

*Primary Examiner* — Sai Ming Chan
(74) *Attorney, Agent, or Firm* — Osha Liang LLP

(57) ABSTRACT

The present invention is designed to realize appropriate reporting of information about the allocation of UL signals. A user terminal has a receiving section that receives downlink control information including uplink resource allocation information, a control section that determines, based on the uplink resource allocation information, a resource block (RB) allocation pattern that is repeated every given-number of resource blocks, and a transmitting section that transmits a UL signal by using a plurality of resource blocks that are determined based on the RB allocation pattern.

11 Claims, 19 Drawing Sheets

TYPE 0 : SINGLE CLUSTER ALLOCATION

TYPE 1 : DUAL CLUSTER ALLOCATION

(51) Int. Cl.
  *H04W 16/14* (2009.01)
  *H04W 74/08* (2009.01)
  *H04L 5/00* (2006.01)
  *H04W 72/04* (2009.01)
  *H04L 1/16* (2006.01)
  *H04L 25/02* (2006.01)
  *H04W 88/06* (2009.01)

(52) U.S. Cl.
  CPC .......... *H04L 5/0044* (2013.01); *H04L 5/0091* (2013.01); *H04L 25/0226* (2013.01); *H04W 16/14* (2013.01); *H04W 72/042* (2013.01); *H04W 72/0446* (2013.01); *H04W 72/0453* (2013.01); *H04W 74/0808* (2013.01); *H04W 88/06* (2013.01)

(58) Field of Classification Search
  CPC .............. H04W 74/0808; H04W 88/06; H04L 1/1614; H04L 5/0044; H04L 5/005; H04L 5/0091; H04L 25/0226
  USPC .......................................................... 370/329
  See application file for complete search history.

(56) References Cited

U.S. PATENT DOCUMENTS

2017/0118728 A1   4/2017  Harada et al.
2018/0092128 A1*  3/2018  Um ................... H04W 72/0406

OTHER PUBLICATIONS

3GPP TS 36.300 V8.12.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Mar. 2010 (149 pages).

AT&T; "Drivers, Benefits and Challenges for LTE in Unlicensed Spectrum"; 3GPP TSG-RAN Meeting #62 RP-131701; Busan, Korea; Dec. 3-6, 2013 (3 pages).

International Search Report issued for PCT/JP2017/013300, dated May 16, 2017 (3 pages).

Written Opinion issued for PCT/JP2017/013300, dated May 16, 2017 (9 pages).

Extended European Search Report issued in counterpart European Patent Application No. 17775421.5, dated Mar. 8, 2019 (8 Pages). Nokia Networks, Alcatel-Lucent, Alcatel-Lucent Shanghai Bell; "UL waveform for LAA PUSCH"; 3GPP TSG-RAN WG1 Meeting #84, R1-160775; St. Julian's, Malta, Feb. 15-19, 2016 (9 Pages).

Ericsson; "On an LAA SCell with 10 MHz Bandwidth"; 3GPP TSG RAN WG1 Meeting #84, R1-161002; St. Julian's, Malta, Feb. 15-19, 2016 (3 Pages).

* cited by examiner

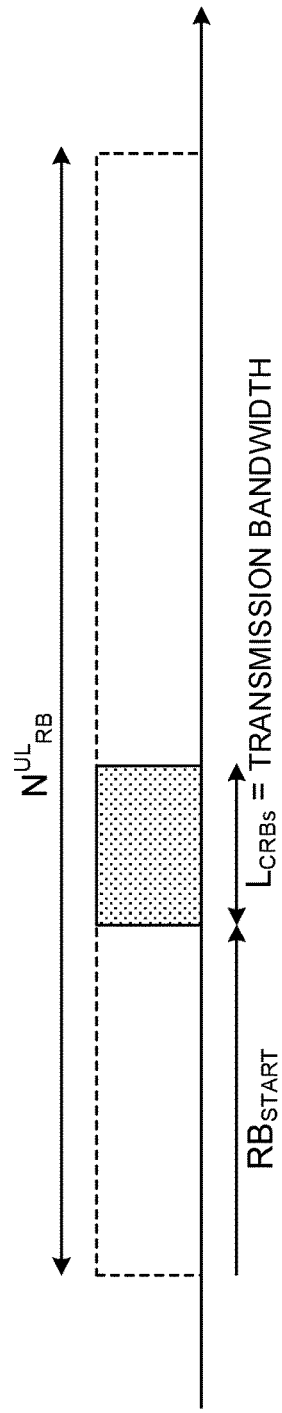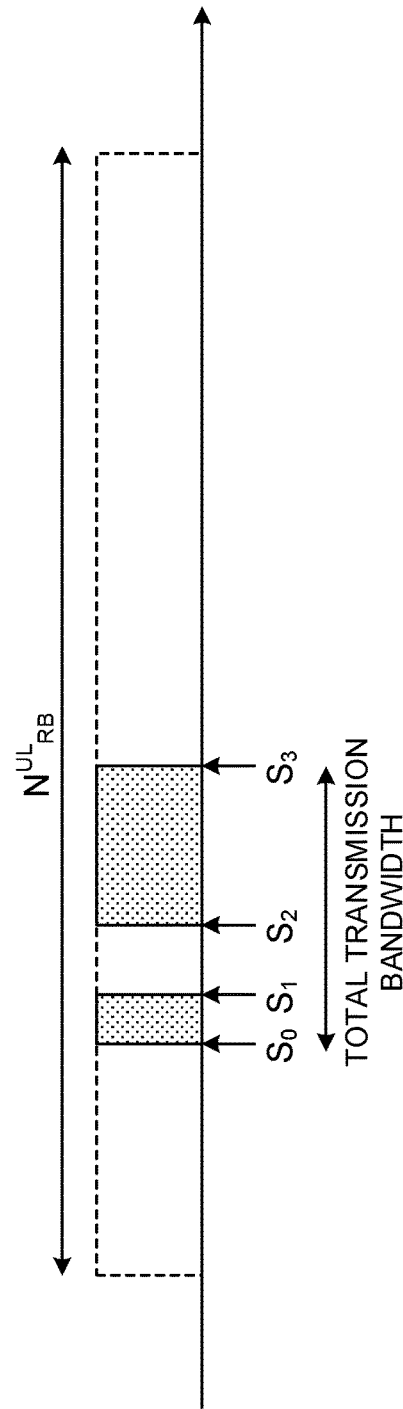

| OFFSET (UNIT SYMBOL) | x4 | x5 | x6 |
|---|---|---|---|
| 0 (NO OFFSET) | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

FIG. 8

| VALUE | DESCRIPTION |
|---|---|
| 0 | UpPTS OF PREVIOUS SUBFRAME/$1^{ST}$ AVAILABLE VALID SYMBOL OF THE UL SUBFRAME |
| 1 | END OF VALID SYMBOL OF THE UL SUBFRAME |

FIG. 11

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12, etc.) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

The specifications of Rel. 8 to 12 LTE have been drafted assuming exclusive operation in frequency bands that are licensed to operators (also referred to as "licensed bands"). As licensed bands, for example, 800 MHz, 1.7 GHz and 2 GHz are used.

In recent years, user traffic has been increasing steeply, following the spread of high-performance user terminals (UE: User Equipment) such as smart-phones and tablets. Although more frequency bands need to be added to accommodate this increasing user traffic, licensed bands have limited spectra (licensed spectra).

Consequently, a study is in progress with Rel. 13 LTE to enhance the frequencies of LTE systems by using bands of unlicensed spectra (also referred to as "unlicensed bands") that are available for use apart from licensed bands (see non-patent literature 2). For example, the 2.4 GHz band and the 5 GHz band, where Wi-Fi (registered trademark) and Bluetooth (registered trademark) can be used, are under study for use as unlicensed bands.

To be more specific, with Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). Note that, in the future, dual connectivity (DC) between licensed bands and unlicensed bands and stand-alone (SA) of unlicensed bands may become the subject of study under LAA.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)" April 2010

Non-Patent Literature 2: AT&T, Drivers, Benefits and Challenges for LTE in Unlicensed Spectrum, 3GPP TSG-RAN Meeting #62 RP-131701

SUMMARY OF INVENTION

Technical Problem

In uplink (UL) transmission in licensed bands, clustered single-carrier frequency division multiple access (SC-FDMA: Single Carrier Frequency Division Multiple Access) is employed, in which resource blocks (PRBs: Physical Resource Blocks) are used as allocation units, and in which clusters, which are 1 or more consecutive PRBs, are allocated to user terminals. In clustered SC-FDMA in licensed bands, single cluster allocation to allocate a single cluster and dual cluster allocation to allocate 2 clusters are supported.

On the other hand, uplink transmission in unlicensed bands is assumed to exhibit different characteristics than uplink transmission in licensed bands, such that a user terminal's minimum transmission bandwidth is limited to be bigger than a predetermined bandwidth. For example, multi-cluster allocation to allocate multiple clusters is under study for uplink resource allocation in unlicensed bands. However, to perform multi-cluster allocation adequately, it is necessary to report information about uplink resource allocation to user terminals adequately.

Furthermore, for unlicensed bands, a study is in progress to introduce interference control functionality in order to allow co-presence with other operators' LTE, Wi-Fi and/or other systems. In Wi-Fi, LBT (Listen Before Talk), which is based on CCA (Clear Channel Assessment), is used as an interference control function for use within the same frequency.

Consequently, even when unlicensed bands are configured in LTE systems, UL transmission and DL transmission may be controlled separately by applying "listening" (for example, LBT) as an interference control function. When a reference signal (for example, an aperiodic SRS) is transmitted in UL transmission in an unlicensed band, the problem is how to control the position to allocate the SRS, taking into account the configuration of listening and/or multiplexing with an uplink data signal and so on. In this case, it is necessary to appropriately report the method of allocating reference signals in the unlicensed band and/or information about the allocation of reference signals to user terminals.

The present invention has been made in view of the above, and it is therefore an object of the present invention to provide a user terminal, a radio base station and a radio communication method that enable appropriate reporting of information about UL signal allocation.

Solution to Problem

A user terminal according to an example of the present invention has a receiving section that receives downlink control information including uplink resource allocation information, a control section that determines, based on the uplink resource allocation information, a resource block (RB) allocation pattern that is repeated every given-number of resource blocks, and a transmitting section that transmits a UL signal by using a plurality of resource blocks that are determined based on the RB allocation pattern.

Advantageous Effects of Invention

According to an example of the present invention, adequate reporting of information about the allocation of UL signals can be realized.

BRIEF DESCRIPTION OF DRAWINGS

FIG. 1A and FIG. 1B are diagrams each showing an example of uplink resource allocation;

FIG. 8 is a diagram to show an example of a table in which the frequency offsets for RB mapping patterns are defined;

FIG. 11 is a diagram to show an example of a table showing positions where SRSs are multiplexed;

DESCRIPTION OF EMBODIMENTS

Figure 2:
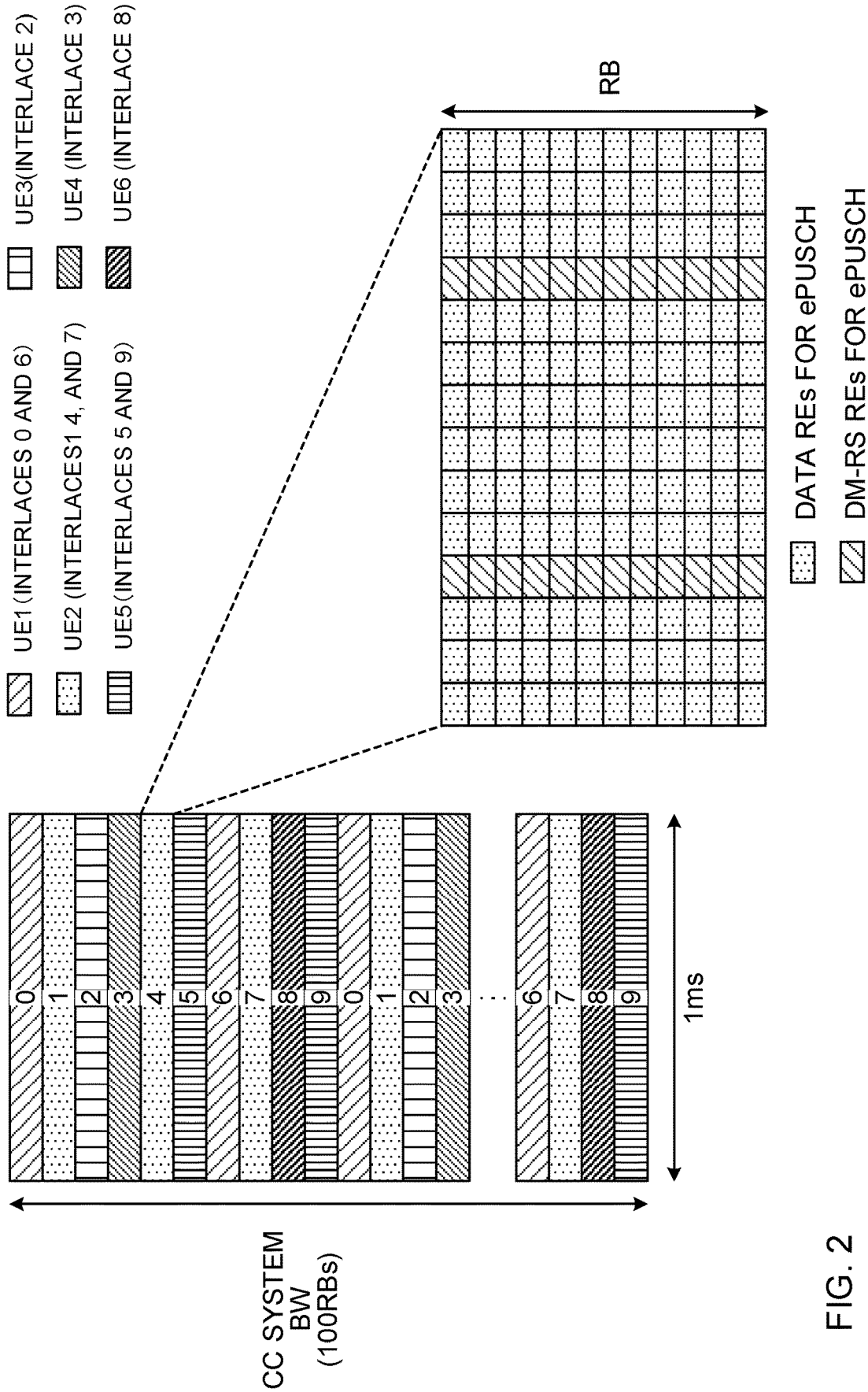
FIG. 2 is a diagram to show an example of interlaced multi-cluster allocation.

In systems that run LTE/LTE-A in unlicensed bands (for example, LAA systems), interference control functionality is likely to be necessary in order to allow co-presence with other operators' LTE, Wi-Fi and/or other systems. Note that systems that run LTE/LTE-A in unlicensed bands may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier (which may also be referred to as a "carrier frequency" or simply a "frequency") of an unlicensed band detects another entity (for example, another user terminal) that is communicating using this unlicensed band carrier, the transmission point is disallowed to make transmission in this carrier.

Therefore, the transmission point performs listening (LBT: Listen Before Talk) at a timing a predetermined period before a transmission timing. To be more specific, by executing LBT, the transmission point searches the whole of the target carrier band (for example, 1 component carrier (CC)) at a timing that is a predetermined period before a transmission timing, and checks whether or not other pieces of apparatus (for example, radio base stations, user terminals, Wi-Fi apparatus and so on) are communicating in this carrier band.

Note that, in the present specification, "listening" refers to the operation which a given transmission point (for example, a radio base station, a user terminal, etc.) performs before transmitting signals, in order to check whether or not signals to exceed a predetermined level (for example, predetermined power) are being transmitted from other transmission points. Furthermore, listening that is performed by radio base stations and/or user terminals may be referred to as "LBT," "CCA" (Clear Channel Assessment), "carrier sensing" or the like.

The transmission point then carries out transmission using this carrier only if it is confirmed that no other apparatus is communicating. For example, if the received power measured during LBT (the received signal power during the LBT period) is equal to or lower than a predetermined threshold, the transmission point judges that the channel is in the idle state (LBT and carries out transmission. When a "channel is in the idle state," this means that, in other words, the channel is not occupied by a specific system, and it is equally possible to say that a channel is "idle," a channel is "clear," a channel is "free," and so on.

On the other hand, if only just a portion of the target carrier band is detected to be used by another piece of apparatus, the transmission point stops its transmission. For example, if the transmission point detects that the received power of a signal from another piece of apparatus in this band exceeds a predetermined threshold, the transmission point judges that the channel is in the busy state ($LBT_{busy}$), and makes no transmission. In the event $LBT_{busy}$ is yielded, LBT is carried out again with respect to this channel, and the channel becomes available for use only after the idle state is confirmed. Note that the method of judging whether a channel is in the idle state/busy state based on LBT is by no means limited to this.

In DL communication, when the result of listening (DL-LBT) performed by a radio base station before DL transmission indicates "LBT-idle," a period during which DL transmission to skip LBT (DL burst transmission) is allowed can be configured. The period during which transmission is allowed without performing LBT after listening (in the event of LBT-idle) is also referred to as "DL maximum channel occupancy time" (DL MCOT), "channel occupancy time," "burst period" (burst transmission period, burst length, maximum burst length, maximum possible burst length, maximum burst length, etc.) and so on.

In UL communication, when the result of listening (UL-LBT) performed by a user terminal before UL transmission indicates "LBT-idle," a period during which UL transmission to skip LBT (UL burst transmission) is allowed can be configured. The period during which transmission is permitted without performing LBT after listening (in the event of LBT-idle) is also referred to as "UL maximum channel occupancy time" (UL MCOT), "channel occupancy time," "burst period" (burst transmission period, burst length, maximum burst length, maximum possible burst length, maximum burst length, etc.) and so on.

As described above, by introducing interference control that is based on LBT mechanism and that is for use within the same frequency to transmission points in LAA systems, it becomes possible to prevent interference between LAA and Wi-Fi, interference between LAA systems and so on. Furthermore, even when transmission points are controlled independently per operator that runs an LAA system, LBT makes it possible to reduce interference without learning the details of each operator's control.

Also, in LAA systems, it might occur that, when LBT succeeds (idle state), the minimum transmission bandwidth to be used by a transmission point is limited to a predetermined bandwidth (for example, 5 MHz or 4 MHz) or more.

First Embodiment

Now, in uplink transmission in a licensed band (for example, an existing LTE system's cell), clustered SC-FDMA, in which clusters of 1 or more consecutive PRBs are allocated to user terminals, and in which resource blocks (physical resource blocks (PRBs, PRB pairs, etc.) are used as allocation units, is used. Clustered SC-FDMA is also referred to as "clustered DFT spread OFDM," "clustered DFT-S-OFDM," and so on.

To be more specific, in uplink transmission in a licensed band, single cluster allocation to allocate a single cluster to 1 user terminal (also referred to as "type 0," "uplink resource allocation type 0," "single cluster transmission," etc.) and dual cluster allocation to allocate 2 clusters to 1 user terminal (also referred to as "type 1," "uplink resource allocation type 1," "dual cluster transmission," etc.) are supported.

FIG. 1 are diagrams to show examples of uplink resource allocation in a licensed band. FIG. 1A shows examples of resources allocated by single cluster allocation (hereinafter referred to as "type 0"). FIG. 1B shows examples of resources allocated by dual cluster allocation (hereinafter referred to as "type 1").

As shown in FIG. 1A, in type 0, resources to allocate to a user terminal are indicated by the starting resource block ($RB_{START}$) and a resource indication value (RIV), which correspond to the number of consecutive resource blocks (transmission bandwidth) to be allocated ($L_{CRBs}$, $L_{CRBs} \geq 1$). This RIV is calculated based on the number of resource blocks ($N^{UL}_{RB}$) constituting the uplink band, above $RB_{START}$ and above $L_{CRBs}$, and arranged in the resource allocation field of downlink control information (DCI) (also referred to as "uplink scheduling grant," "UL grant," etc.). For example, when the uplink system band is 20 MHz, the resource allocation field is comprised of 13 bits.

As shown in FIG. 1B, in type 1, resources to be allocated to a user terminal include 2 clusters (also referred to as "sets of resource blocks," "resource block sets," etc.). Each cluster is formed with 1 or more consecutive resource blocks. The resources to be allocated to the user terminal are designated by indices $S_0$ and $S_1$, which represent the starting and ending positions of the first cluster, and indices $S_2$ and $S_3$, which represent the starting and ending positions of the second cluster.

Indices r to represent indices $S_0$, $S_1$, $S_2$ and $S_3$ are placed in the resource allocation field of a UL grant. For example, when the uplink system band is 20 MHz, the resource allocation field is comprised of 14 bits. Indices $S_0$, $S_1$, $S_2$ and $S_3$ may be indices of resource blocks or indices of resource block groups (RBGs).

In uplink transmission in a licensed band such as described above, uplink coverage is secured by narrowing the transmission bandwidth (for example, $L_{CRBs}$ in FIG. 1A) of user terminals and concentrating the transmission power in the narrowed transmission bandwidth.

Meanwhile, in uplink transmission in an unlicensed band, it might occur that the minimum transmission bandwidth is limited to be a predetermined bandwidth or bigger—for example 4 MHz. In this way, in an unlicensed band where the minimum transmission bandwidth is configured to be equal to or larger than a predetermined bandwidth, the uplink resource allocation schemes for licensed bands shown in FIG. 1 may not be suitable.

To be more specific, in type 0 shown in FIG. 1A, if, for example, the transmission bandwidth $L_{CRBs}$ of a user terminal is limited to be a predetermined bandwidth (for example, 4 MHz, 20 resource blocks, etc.) or bigger, the transmission power may be dispersed beyond the predetermined bandwidth, resulting in the possibility that the uplink coverage deteriorates. Also, when the transmission bandwidth $L_{CRBs}$ is limited to a predetermined bandwidth, fewer types of transmission bandwidths $L_{CRBs}$ can be presumed, and therefore it might occur that not all of the number of bits of the existing resource allocation field need to be used.

Furthermore, in type 1 shown in FIG. 1B, when the overall transmission bandwidth ($S_3$-$S_0$) (also referred to as "total transmission bandwidth") of a user terminal is limited to be a predetermined bandwidth (for example, 4 MHz, 20 resource blocks) or bigger, it might occur that it is no longer necessary to make the first and second cluster sizes changeable. That is, it might occur that the size of the first cluster ($S_1$-$S_0$) and the size of the second cluster ($S_3$-$S_2$) no longer need to be specified using 4 indices $S_0$, $S_1$, $S_2$ and $S_3$.

Therefore, it is desirable to have an uplink resource allocation scheme that is suitable for unlicensed bands in which the transmission bandwidth (total transmission bandwidth) is limited to be a predetermined bandwidth (for example, 4 MHz, 20 resource blocks) or bigger. To be more specific, an uplink resource allocation scheme that is capable of securing uplink coverage even when the transmission bandwidth (total transmission bandwidth) of a user terminal is set to be equal to or larger than a predetermined bandwidth (for example, 4 MHz) is in need.

As such an uplink resource allocation scheme, for example, multi-cluster allocation, in which a plurality of clusters that are uniformly distributed in the frequency direction in the system band are used as transmission units, and in which these transmission units are allocated to user terminals, is under study. In multi-cluster allocation, the maximum number of clusters that can be allocated to 1 user terminal is not limited to 2 as in the licensed-band uplink resource allocation schemes shown in FIG. 1. This multi-cluster allocation is also referred to as "interlaced multi-cluster allocation," "interlaced multi-cluster transmission" and so on.

FIG. 2 is a diagram to show an example of interlaced multi-cluster allocation. In FIG. 2, the units of transmission in uplink transmission are constituted by a plurality of clusters arranged (spaced) at equal intervals in the frequency direction within the system band. These transmission units may be referred to as "interlaces." Each cluster to constitute 1 interlace is formed with 1 or more consecutive frequency units (these are, for example, resource blocks and subcarriers, or, for example, 1 resource block may be used as shown in FIG. 2).

For example, in FIG. 2, the system band is 20 MHz (100 resource blocks), and interlace # i is formed with 10 resource blocks (clusters) with index values {i, i+10, i+20, . . . and i+90}. In FIG. 2, the number assigned to each resource block indicates the index of the interlace.

As shown in FIG. 2, when the uplink system band is formed with 20 MHz (100 resource blocks), 10 interlaces #0 to #9 can be configured. For example, in FIG. 2, interlaces #0 and #6 are allocated to user terminal #1. That is, 20 clusters that constitute interlaces #0 and #6 are allocated to user terminal #1.

Likewise, 30 clusters that constitute interlaces #1, #4 and #7 are allocated to user terminal #2. In addition, 10 clusters that constitute interlace #2 are allocated to user terminal #3. In addition, 10 clusters that constitute interlace #3 are allocated to user terminal #4. 20 clusters that constitute interlaces #5 and #9 are allocated to user terminal #5. In addition, 10 clusters that constitute interlace #8 are allocated to user terminal #6.

In FIG. 2, 1 resource block in 1 interlace corresponds to 1 cluster, but this is not limiting. 1 cluster may be formed with 1 or more consecutive frequency units (for example, resource blocks (RBs), subcarriers, resource block groups, etc.). Also, although an interlace (transmission unit) is comprised of 10 clusters in FIG. 2, the number of clusters to constitute 1 interlace is not limited to 10.

In the interlaced multi-cluster allocation shown in FIG. 2, an interlace (transmission unit) to be allocated to a user terminal is constituted by a plurality of clusters dispersed in the system band, so that the total transmission bandwidth of the user terminal can be made equal to or larger than a predetermined bandwidth (for example, 4 MHz). Meanwhile, for example, since each cluster is constituted by a narrow band such as 1 resource block, by concentrating the transmission power in this narrow band, deterioration of uplink coverage can be prevented.

Figure 3A:
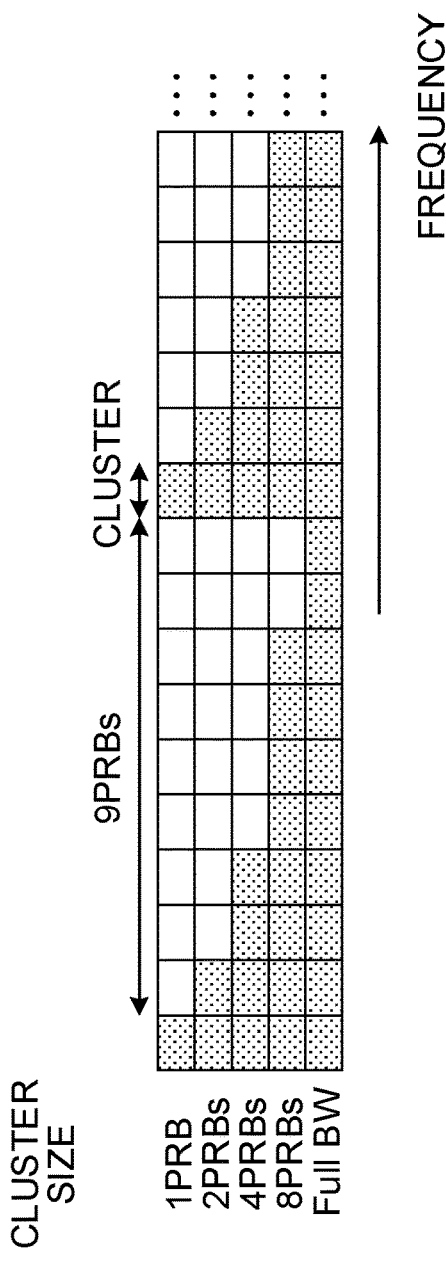
FIG. 3A and FIG. 3B are diagrams each showing another example of interlaced multi-cluster allocation.

Also, in multi-cluster allocation, allocation methods to use adjacent interlaces and methods to allocate multiple interlaces regardless of adjacent interlaces may be possible. FIG. 3A shows an example of allocation of adjacent interlaces. FIG. 3A shows a case where, when an interlace is formed with 10 clusters (here, 10 RBs), 2 or more cluster sizes are constituted by adjacent interlaces. In this case, the single-carrier characteristics of UL transmission can be improved.

Figure 3B:
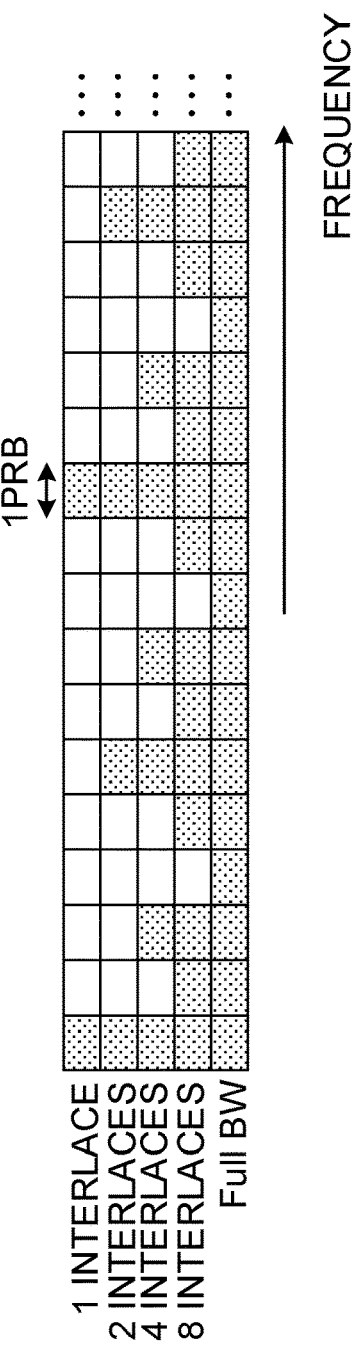

FIG. 3B shows an example of allocation of multiple interlaces. FIG. 3B shows a case where, when multiple interlaces are allocated, at least non-adjacent interlaces are used to allocate clusters to user terminals. Considering the power spectral density (PSD), which is the upper limit of transmission power per 1 MHz, even if many RBs are allocated within 1 MHz, power cannot be increased. Therefore, from the viewpoint of PSD, when allocating multiple interlaces, it is preferable to allocate clusters (for example, RBs) using non-adjacent interlaces.

As described above, in multi-cluster allocation, the allocation methods shown in FIG. 3A and FIG. 3B each have its characteristics, and it is therefore desirable to control the allocation method based on the communication environment and so on. So, the present inventors have focused on the interlaced multi-cluster allocation method, come up with the idea of applying allocation of adjacent interlaces and/or allocation of multiple interlaces that are at least not adjacent based on the communicating environment and so on. Then, the present inventors have found out a method of adequately reporting uplink resource allocation resources to user terminals even when applying allocation of adjacent interlaces and/or applying allocation of multiple non-adjacent interlaces.

According to an example of the present embodiment, downlink control information to include information about uplink resource allocation, in which the same resource (RB or cluster) allocation pattern is repeated every predetermined range (for example, 10 RBs) in the frequency direction, is reported from a radio base station to user terminals. For the information about uplink resource allocation, bit information that represents predetermined resource allocation selected from multiple resource allocation candidates that are configured in advance can be used.

Now, a first embodiment will be described below in detail with reference to the accompanying drawings. Although this embodiment will be described based on the assumption that a carrier (cell) where listening is configured is an unlicensed band, this is by no means limiting. The present embodiment is applicable to any carrier (or cell) in which listening is configured, regardless of whether this carrier is a licensed band or an unlicensed band.

Also, although a case will be assumed with the present embodiment where

CA or DC is applied between a carrier in which listening is not configured (for example, the primary cell (PCell) in a licensed band) and a carrier in which listening is configured (for example, a secondary cell (SCell) in an unlicensed band), this is by no means limiting. For example, the present embodiment is applicable to cases where a user terminal connects on a stand-alone basis with a carrier (cell) in which listening is configured.

Also, in the present embodiment, interlaced multi-cluster allocation is applied to unlicensed band cells, but this is not limiting. This interlaced multi-cluster allocation may be applied to licensed band cells as well.

First Example

A case will be described here with the first example where a bitmap is used as a method for reporting multi-cluster allocation resources.

Figure 4:
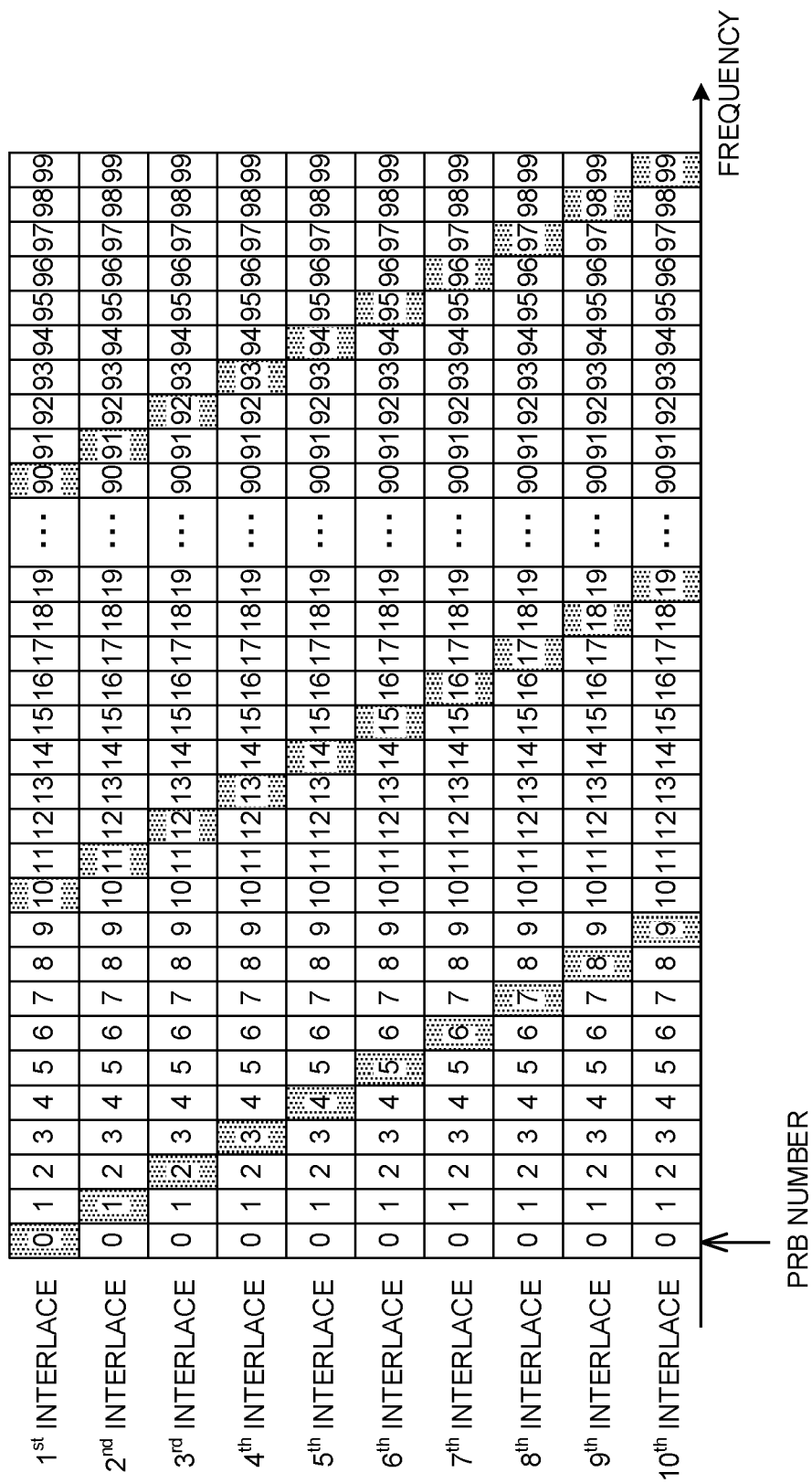
FIG. 4 are diagrams to show examples of RBs (clusters) constituting each interlace.

FIG. 4 shows a case where the system band is 20 MHz (100 resource blocks), and where 10 interlaces (the first interlace to the tenth Interlace) are configured with different 10 RBs (clusters). For example, a case is shown here in which the first interlace is formed with 10 resource blocks (clusters) with index value is {0, 10, 20, . . . , and 90}. Also, a case is shown here in which the second interlace is formed with 10 resource blocks (clusters) with index values {1, 11, 21, . . . , and 91}. The third and subsequent interlaces can be configured in the same way as shown in FIG. 4.

Note that, although 1 resource block in 1 interlace corresponds to 1 cluster in FIG. 4, this is not limiting. 1 cluster may be formed with 1 or more consecutive frequency units (for example, resource blocks (RBs), subcarriers, resource block groups, etc.). Furthermore, although interlaces (transmission units) are constituted by 10 clusters in FIG. 4, the number of clusters that constitute 1 interlace is not limited to 10. For example, the number of interlaces may be set depending on the system band.

The radio base station includes a bitmap to represent 1 or multiple interlaces out of 10 interlaces in a predetermined field in downlink control information (for example, UL grant), and transmits this to user terminals. For the predetermined field, for example, the resource allocation field (RA: Resource Allocation Field) of existing systems can be used. The structure of the bitmap can be configured such that each bit corresponds to a different interlace (see FIG. 5). For example, a structure may be employed here in which the bitmap is comprised of 10 bits corresponding to 10 interlaces, and in which these 10 interlaces can be each designated as "1" or "0."

Figure 5:
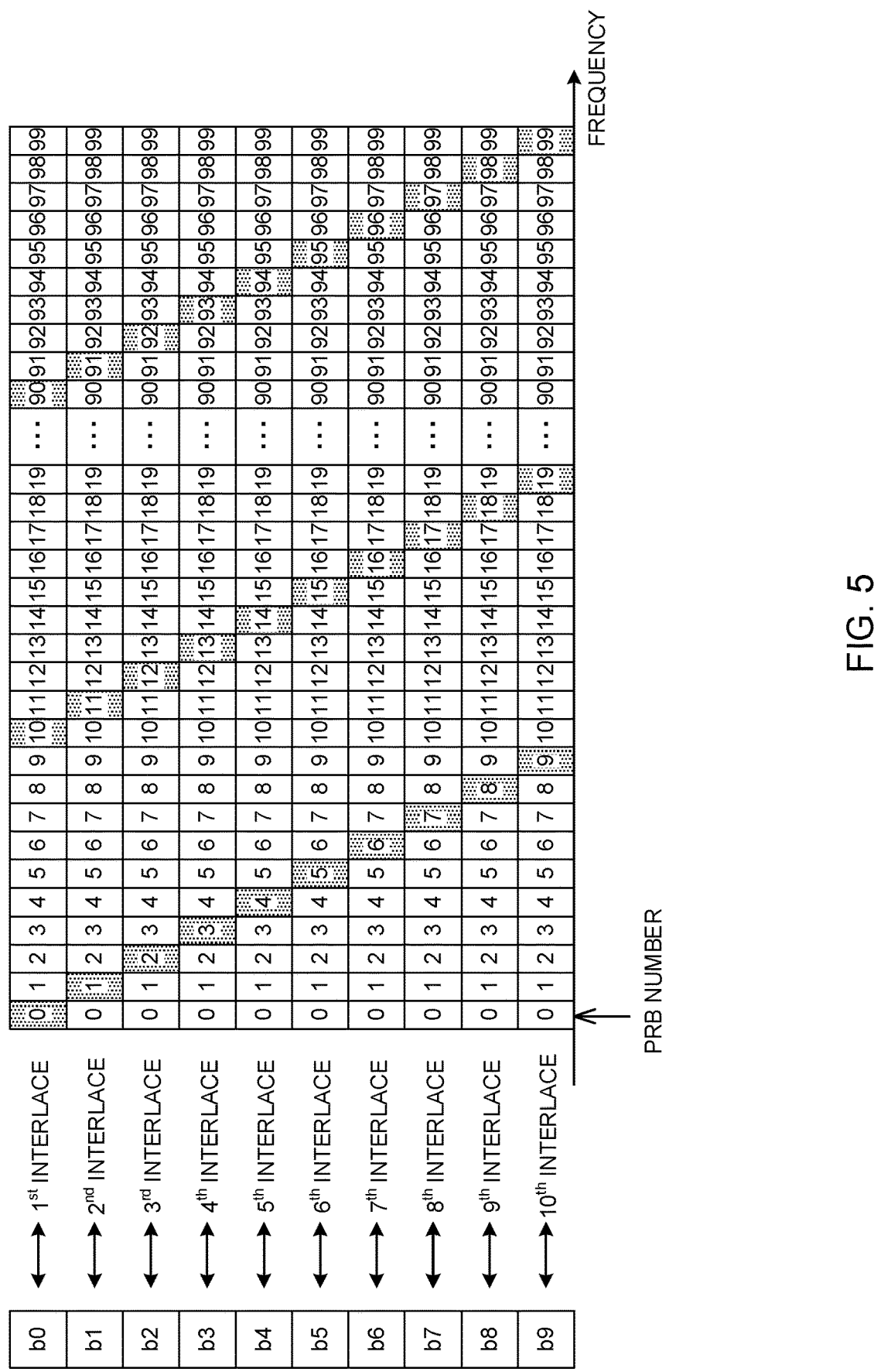
FIG. 5 is a diagram to show an example in which the bit values of a bitmap are associated with each interlace.

FIG. 5 shows a case where 10 interlaces are respectively associated with b0 to b9 (the first interlace to the tenth interlace), respectively. For example, resources that correspond to interlaces with the bit value "0" are not allocated, and resources that correspond to interlaces with the bit value "1" are allocated to user terminals. Note that the structure of the bitmap is not limited to this.

The radio base station selects a predetermined interlace for each user terminal and reports a bitmap. The radio base station reports uplink resource allocation using the bitmap, and so that it is possible to appropriately select and report allocation of adjacent interlaces or allocation of multiple non-adjacent interlaces. The user terminals control the allocation of UL resources (for example, the uplink shared channel) based on the bitmap included in downlink control information transmitted from the radio base station.

Note that the radio base station can make adjustments so that the total number of "1s" to report the resource allocation of interlaces in the bitmap does not become 7. For example, the radio base station can control the allocation of interlaces so that the number of RBs to be allocated is a multiple of 2, 3 or 5, as in conventional LTE UL resource allocation. As a result, it is possible to realize flexible resource allocation while suppressing the complexity of DFT at the time of generating UL transmission waveforms.

Figure 6A:
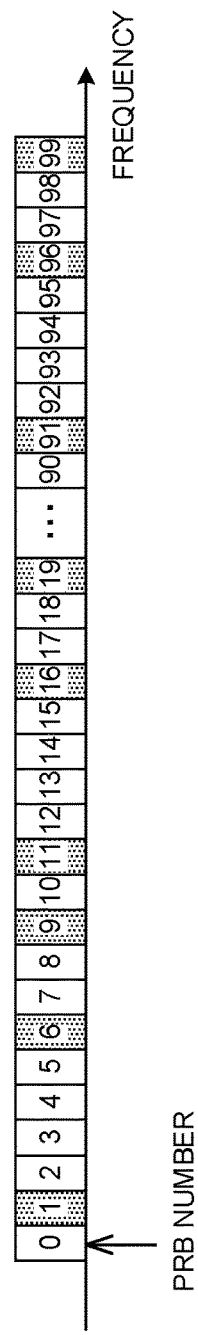
FIG. 6A and FIG. 6B are diagrams to show examples of UL resource allocation methods to use a bitmap.

FIG. 6A shows a case where the radio base station transmits b0 to b9=(0100001001) as a bitmap to a user terminal. This is equivalent to the case where the radio base station allocates the UL resources (RBs or clusters) that correspond to the second, seventh and tenth interlaces to a given user terminal (3 interlaces). The user terminal allocates uplink data to predetermined UL resources (here, PRBs #1, #6, #9, #11, #16, #19 . . . , #91, #96 and #99) based on the bitmap reported from the radio base station.

In this case, allocation to the same resource blocks (here, the first, sixth and ninth RBs) is repeated every predetermined range (here, every 10 RBs) in the frequency direction. Note that it is not necessary to use the same pattern in all of the predetermined ranges (here, the range of every 10 RBs) in the frequency direction, and a structure may be adopted here in which the same pattern is used in at least a plurality of predetermined ranges.

Figure 6B:
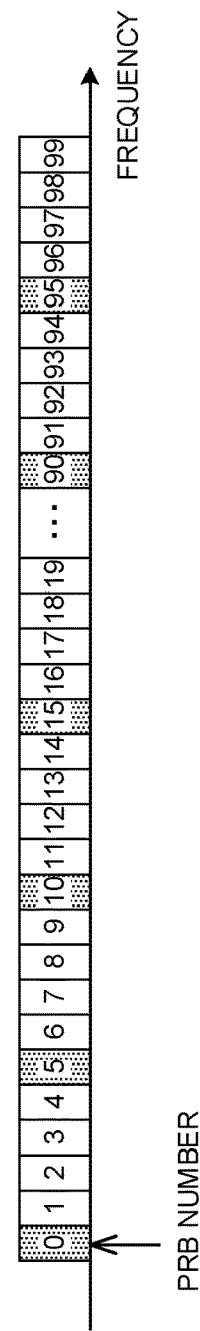

FIG. 6B shows a case where the radio base station transmits b0–b9=(1000010000) as a bitmap to a user terminal. This is equivalent to the case where the radio base station allocates UL resources corresponding to the first and sixth interlaces (2 interlaces) to the user terminal. The user terminal allocates uplink data to predetermined UL resources (here, PRBs #0, #5, #10, #15 . . . , #90 and #95) based on the bitmap reported from the radio base station.

That is, allocation to the same resource blocks (here, the 0th and 5th RBs) is repeated every predetermined range (here, every 10 RBs) in the frequency direction. Note that it is not necessary to use the same pattern in all of the predetermined ranges (here, the range of every 10 RBs) in the frequency direction, and a structure may be adopted here in which the same pattern is used in at least a plurality of predetermined ranges.

In this way, the allocation of UL resources is controlled by selecting predetermined interlaces from multiple interlaces formed with different RBs (clusters), and, furthermore, bit information (bitmap) to represent the selected interlaces is reported to user terminals. This allows the radio base station to configure UL resources in accordance with allocation of adjacent interlaces or allocation of multiple non-adjacent interlaces, and report these UL resources to the user terminal in downlink control information.

Second Example

With a second example, a case to use bit information corresponding to predetermined patterns will be described, as a method of reporting multi-cluster allocation resources. To be more specific, a plurality of resource allocation patterns (mapping patterns) are defined in advance, and bit values that correspond to predetermined resource allocation patterns are selected and reported to user terminals.

Figure 7:
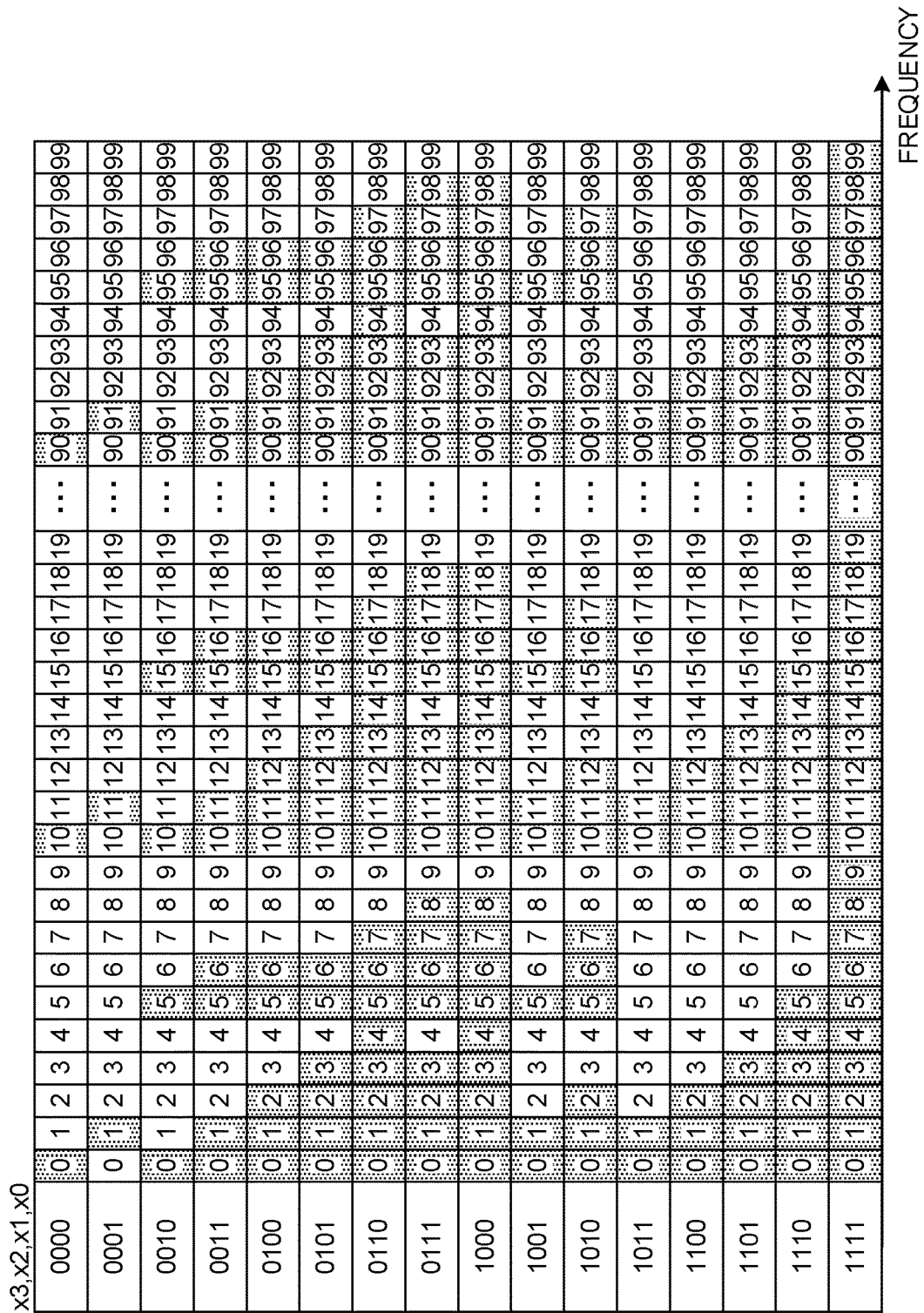
FIG. 7 is a diagram to show examples of multiple pre-defined RB mapping patterns.

FIG. 7 shows an example of a case where 16 RB mapping patterns (4 bits) are defined. Here, a case of applying a configuration in which the RB mapping pattern that corresponds to each bit value (x3, x2, x1 or x0) becomes the same every predetermined range in the frequency direction (here, every 10 RBs). For example, the RB mapping pattern to correspond to each bit value can be a single interlace or can be a structure combining multiple interlaces.

For example, the bit values "0000" in FIG. 7 correspond to the first interlace (the first interlace to the tenth interlace) in FIG. 4, and the bit values "0010" correspond to the combination of the first and sixth interlaces (the first interlace+the sixth interlace) in FIG. 4. Also, the predefined RB mapping patterns may be preferably defined such that both allocation of adjacent interlaces and allocation of multiple non-adjacent interlaces are included. Obviously, the predefined RB mapping patterns may be defined to include only 1 of these configurations.

Also, it is preferable that the number of bits to represent the predefined RB mapping patterns is set to be smaller than a predetermined value (for example, 10 bits). This makes it possible to reduce the overhead of downlink control information as compared with the case of using a bitmap.

In addition to the multiple RB mapping patterns shown in FIG. 7, a bit field to represent offsets in the frequency direction with respect to these RB mapping patterns may be provided. FIG. 8 shows a case where offsets for RB patterns in the frequency direction are defined with 3 bits (x6, x5 and x4). In this case, the offsets can be defined between 0 (no offset) and 7, so that each RB mapping pattern shown in FIG. 7 can be shifted in the frequency direction through 7 resources (RBs or sub carriers) at a maximum.

It is also preferable to employ a configuration in which the sum of the bit information representing RB mapping patterns and the bit information representing frequency offsets is smaller than a predetermined value (for example, 10 bits). For example, when a predetermined field (for example, RA field) of X bits (for example, X=7) is provided in downlink control information, the bit information to represent RB mapping patterns is comprise of Y bits (for example, Y=4), and the bit information to represent frequency offsets is comprised of Z bits (for example, Z=3 (=X−Y)). This makes it possible to reduce the overhead of downlink control information as compared with the case of using a bitmap.

FIG. 9 show examples of cases where a radio base station transmits bit information that represents a predetermined RB mapping pattern and a frequency offset to be applied to the predetermined RB mapping pattern, to a given user terminal. Here, a case is shown in which the RB mapping pattern is defined with 4 bits (x3, x2, x1 and x0) and the frequency offset is defined with 3 bits (x6, x5 and x4), but this is not limiting.

Figures 9A, 9B:
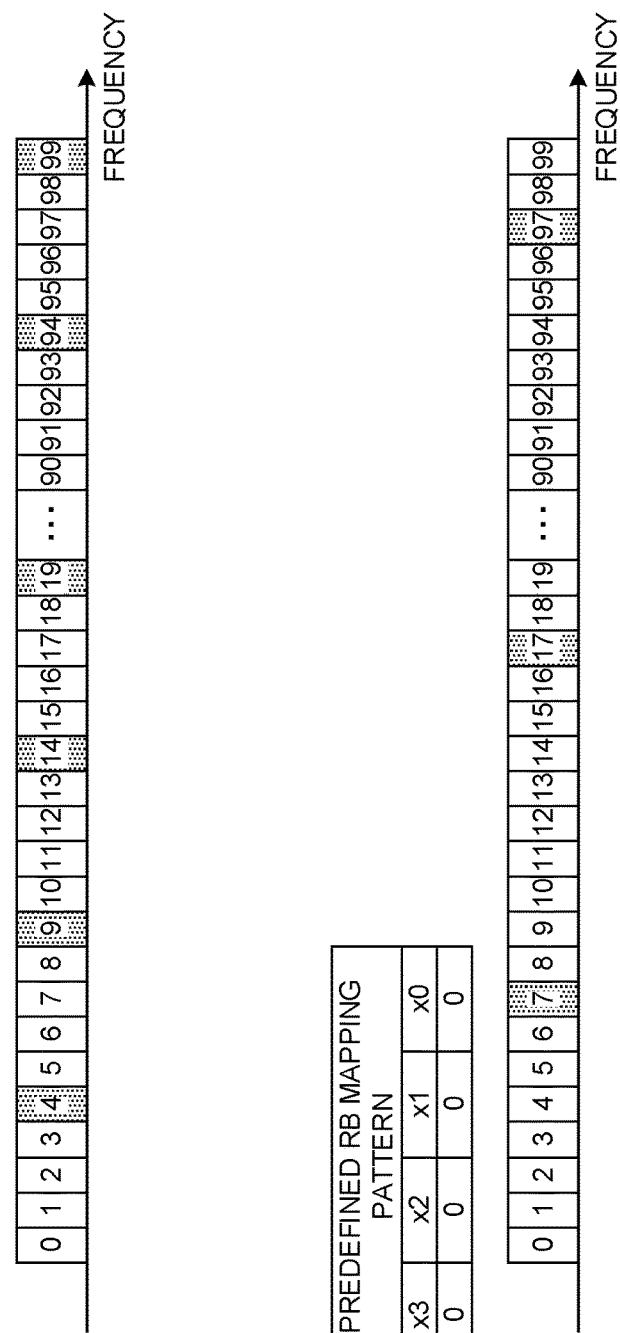
FIG. 9A and FIG. 9B are diagrams to show examples of UL resource allocation methods to use RB mapping patterns and frequency offsets.

FIG. 9A shows a case where the radio base station reports 1000010 (=x6, x5, x4, x3, x2, x1 and x0) to the user terminal as bit information (7 bits) to represent a predetermined RB mapping pattern and a frequency offset. To be more specific, the bit values (x3, x2, x1 and x0) to correspond to the predetermined RB mapping pattern are "0010," and, when the mapping patterns shown in FIG. 7 are applied, correspond to the combination of the first and sixth interlaces (the first interlace+the sixth interlace). The bit values (x6, x5 and x4) to correspond to the frequency offset is "100," and, when the frequency offsets shown in FIG. 8 are applied, the offset value is 4.

The user terminal allocates uplink data to predetermined UL resources (here, PRBs #4, #9, #14, #19 . . . , #94 and #99) based on the bit information reported from the radio base station. In this case, allocation to the same resource blocks (here, the fourth and ninth RBs) is repeated every predetermined range (here, 10 RBs) in the frequency direction. Note that it is not necessary to use the same pattern in all of the predetermined ranges (here, the range of every 10 RBs) in the frequency direction, and a structure may be adopted here in which the same pattern is used in at least a plurality of predetermined ranges.

FIG. 9B shows a case where a radio base station reports 1110000 (=x6, x5, x4, x3, x2, x1 and x0) to a user terminal as bit information (7 bits) to represent a predetermined RB mapping pattern and a frequency offset. To be more specific, the bit values (x3, x2, x1 and x0) to correspond to the predetermined RB mapping pattern is "0000," and when the mapping patterns shown in FIG. 7 are applied, correspond to the first interlace (first interlace). The bit values (x6, x5 and x4) to correspond to the frequency offset is "111," and, when the frequency offsets shown in FIG. 8 are applied, the offset value is 7.

The user terminal allocates uplink data to predetermined UL resources (here, PRBs #7, #17 . . . and #97) based on the bit information reported from the radio base station. In this case, allocation to the same resource block (here, the seventh RB) is repeated every predetermined range (here, 10 RBs) in the frequency direction. Note that it is not necessary to use the same pattern in all of the predetermined ranges (here, the range of every 10 RBs) in the frequency direction, and a structure may be adopted here in which the same pattern is used in at least a plurality of predetermined ranges.

In this way, it is possible to reduce the overhead of downlink control information by controlling the allocation of UL resources by combining a plurality of predefined RB mapping patterns and frequency offsets using smaller number of bits than a predetermined value. Furthermore, by including allocation of adjacent interlaces and allocation of multiple non-adjacent interlaces in a plurality of predefined RB mapping patterns, the radio base station can appropriately select either configuration and control UL resources.

Second Embodiment

With a second embodiment, an example of transmission control of UL reference signals (for example, SRS) in a cell to employ listening will be described. Note that the second embodiment may be applied alone or in combination with the first embodiment.

In a cell where listening is not employed (for example, a licensed band cell of an existing system), the SRS (A-SRS) that is transmitted aperiodically from user terminals is supported. In existing systems, a radio base station reports downlink control information to trigger aperiodic SRS transmission to a user terminal, and, in response to this trigger, the user terminal transmits the aperiodic SRS with an uplink shared channel (PUSCH).

Figure 10A:
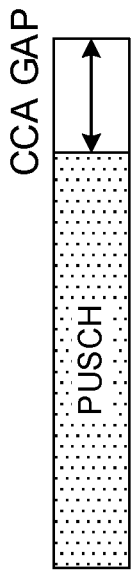
FIG. 10A to FIG. 10E are diagrams showing examples of positions where SRSs are multiplexed.

Even in LAA using unlicensed band cells, studies are in progress to support aperiodic SRS transmission. On the other hand, unlicensed band cells are under study to perform aperiodic SRS transmission even when the PUSCH is not transmitted. In this case, in unlicensed band cells, a frame structure in which PUSCH transmission alone is performed (see FIG. 10A), a frame structure in which both PUSCH transmission and SRS transmission are performed (see FIGS. 10B and 10C) and a frame structure in which SRS transmission alone is performed (see FIGS. 10D and 10E) may be applied to the PUSCH and the SRS. Note that FIG. 10B and FIG. 10D show cases where the SRS is placed before the PUSCH (for example, at the head of a subframe), and FIG. 10C and FIG. 10E show cases where the SRS is placed after the PUSCH (for example, at the end of a subframe (in the event a listening gap is formed, before the gap)).

Figure 10B:
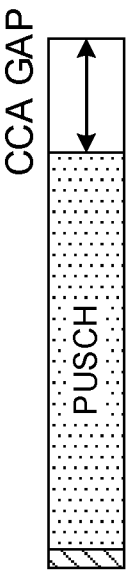
Figure 10C:
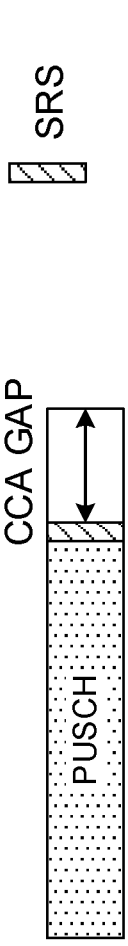
Figure 10D:
Figure 10E:
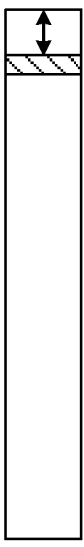

When a first user terminal to perform SRS transmission alone and a second user terminal to perform SRS transmission and PUSCH transmission are multiplexed in a given subframe, it may be possible to apply the structures of FIG. 10B and FIG. 10D, in which SRS transmission is placed at the top of a subframe. By this means, it is possible to prevent the SRS transmission by a first user terminal from blocking the PUSCH transmission by a second user terminal, or prevent the UL transmission by the second user terminal from blocking the CCA gap for the SRS of the first user terminal.

Meanwhile, when the structure where PUSCH transmission alone is performed and the structure where SRS transmission and PUSCH transmission are performed are multiplexed, it is conceivable to apply the structure of FIG. 10C where the SRS transmission is arranged at the end of the subframe. As a result, it is possible to perform accurate channel estimation, on a real time basis, by using the SRS.

In this way, the present inventors have paid attention to the fact that problems such as blocking occur depending on the arrangement of SRSs when a structure in which PUSCH transmission alone is performed, a structure in which both PUSCH transmission and SRS transmission are performed and a structure in which SRS transmission alone is performed are introduced and different structures are applied to a plurality of user terminals. So, the present inventors have come up with the idea of changing and controlling the position to transmit the SRS, on a per user terminal basis, by taking into account which of the structure to perform PUSCH transmission alone, the structure to perform both PUSCH transmission and SRS transmission and the structure to perform SRS transmission alone is used.

For example, when a given user terminal performs both PUSCH transmission and SRS transmission, a configuration in which the position where the SRS is multiplexed can be changed (configurable) is used, and information about the position of the SRS is reported (first example). Also, in the event a given user terminal transmits the SRS alone (that is, the SRS is not transmitted together when the PUSCH is transmitted), a configuration in which the position where the SRS is multiplexed is configured (for example, fixedly configured) in a predetermined position may be used (second example). Note that, although the SRS will be shown in the following description, the present embodiment is not limited to this, and other UL signals (for example, other reference signals) can be used.

First Example

When a radio base station commands both PUSCH transmission and SRS transmission to a user terminal, the radio base station reports information about the position of the SRS (the multiplexing position, the mapping position, etc.) to the user terminal. The user terminal controls the transmission of the SRS and the PUSCH based on the information about the position of the SRS received from the radio base station.

As for the multiplexing position (SRS position) of the SRS, it is possible to use the UpPTS (Uplink Pilot Time Slot) in the subframe that is 1 subframe before the UL subframe in which the PUSCH is transmitted, the first available valid symbol that is available for use (first available valid symbol), or the last valid symbol in the UL subframe (end of the valid symbols).

The radio base station can include the information about the position of the SRS in downlink control information and report this to the user terminal. As the downlink control information, a UL grant and/or a common PDCCH can be used. The common PDCCH is a PDCCH that is transmitted to a plurality of user terminals in common, and may be a common search space.

For example, the radio base station includes information about the position of the SRS in the aperiodic SRS-triggering bit field, and reports this to user terminals. FIG. 11 shows an example of a table in which information to represent the position of the SRS is defined.

In FIG. 11, the bit value "0" is equivalent to bit information that commands mapping of the SRS to the UpPTS in the previous subframe of the UL subframe in which the PUSCH is transmitted and/or to the first available valid symbol in the UL subframe. Which method is used may be determined in advance or may be configured in high layer signaling and so on. Alternatively, this may be determined and selected by user terminals.

The bit value "1" is equivalent to bit information that commands mapping of the SRS to a symbol after the symbol where the PUSCH is allocated in a UL subframe (for example, the last valid symbol in the UL subframe). For example, any symbol that is available for allocation, from the next symbol after the symbol where the symbol to which the PUSCH is allocated to subsequent symbols (for example, the last symbol), can be used.

Considering the mode of SRS transmission (whether or not the SRS is transmitted, whether or not the PUSCH is transmitted when the SRS is transmitted, etc.) to apply to each user terminal, the radio base station transmits information about the position of the SRS at least to user terminals that are commanded to transmit the aperiodic SRS.

Figure 12:
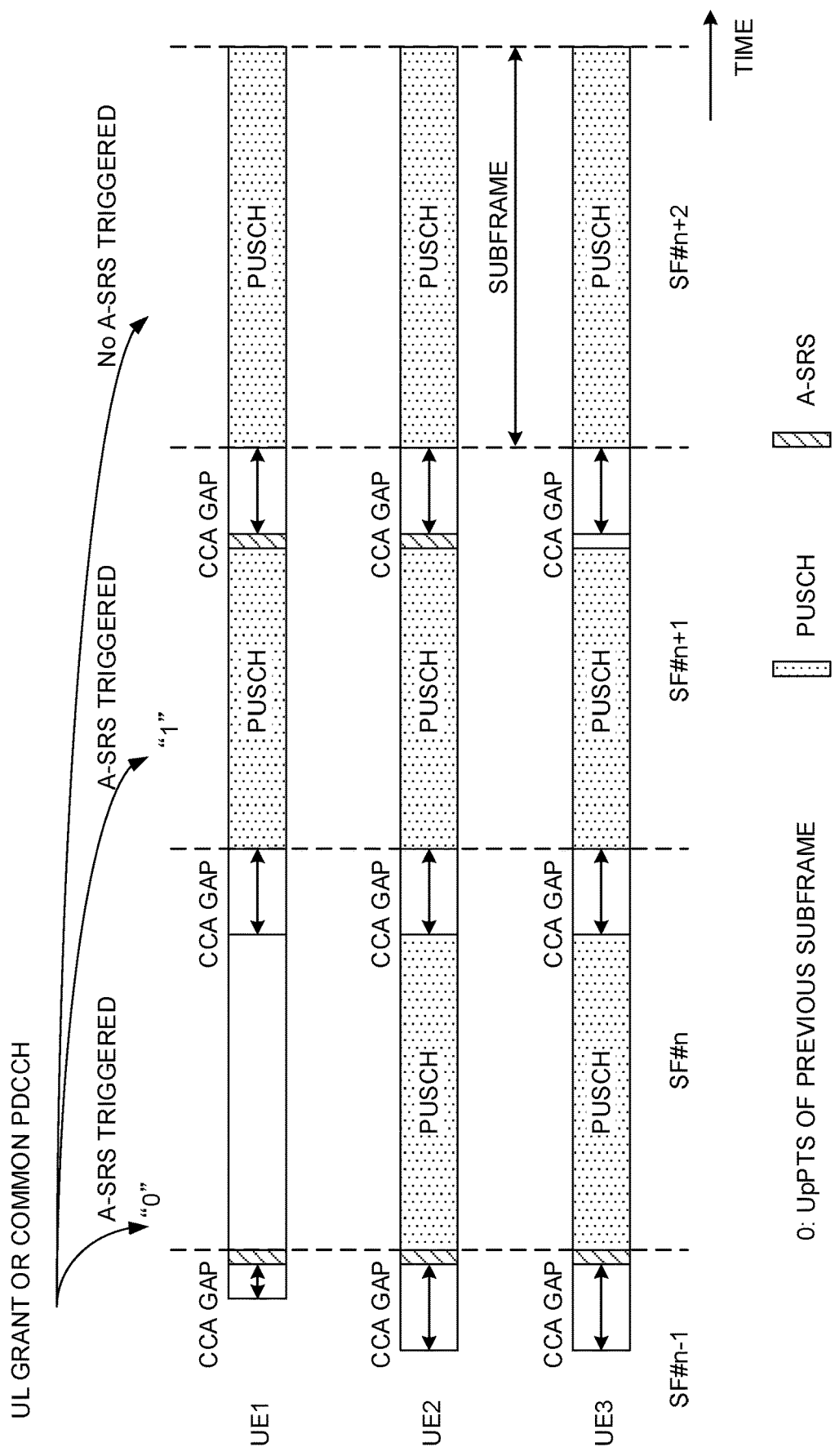
FIG. 12 is a diagram to show an example of an SRS allocation method.
Figure 13:
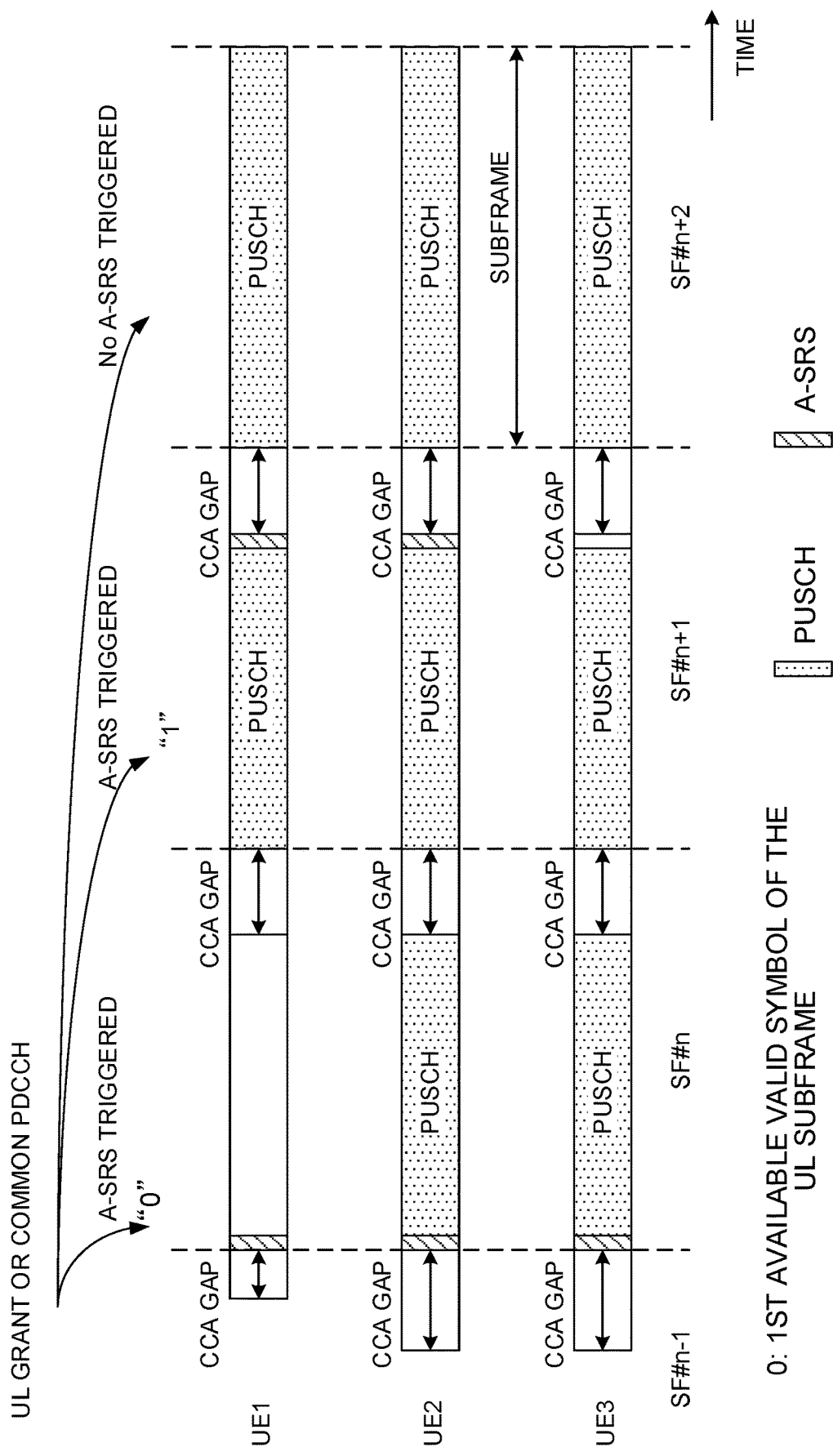
FIG. 13 is a diagram to show another example of an SRS allocation method.

FIG. 12 and FIG. 13 show examples of cases where the position to multiplex the SRS is controlled based on the mode of SRS transmission that applies to each user terminal. Here, cases are shown in which transmission of the aperiodic SRS is appropriately commanded to each of the UE 1 to UE 3 in SF # n−1 to SF # n+2.

To be more specific, cases where the UE 1 is commanded to perform SRS transmission without performing PUSCH transmission in SF # n, and where the UEs 2 and 3 are commanded to perform PUSCH transmission and SRS transmission are shown. Also, in the cases illustrated, in SF # n+1, PUSCH transmission and SRS transmission are commanded to the UEs 1 and 2, and PUSCH transmission alone is commanded to the UE 3. Also, in the cases illustrated, in SF # n+2, PUSCH transmission alone is commanded to the UEs 1 to 3.

In FIG. 12 and FIG. 13, using the downlink control information for scheduling SF # n, the radio base station commands PUSCH transmission and SRS transmission to the UE 2 and the UE 3, and commands SRS transmission alone to the UE 1. Therefore, in SF # n, there are user terminals (UE 2 and UE 3) that transmit both the SRS and the PUSCH and a user terminal (the UE 1) that performs SRS transmission alone without performing PUSCH transmission are present.

The radio base station commands the user terminals to map the SRS to the UpPTS in SF # n−1 before SF # n (see FIG. 12). Alternatively, the radio base station commands the user terminals to map the SRS to the first available valid symbol in SF # n (see FIG. 13). For example, the radio base station includes predetermined bit information (here, "0") in downlink control information based on the table of FIG. 11 and transmits this to the user terminals. As for the downlink control information, a UL grant for scheduling SF # n and/or a common PDCCH can be used.

For example, the radio base station can include an aperiodic SRS trigger and information about the position of the SRS, in a UL grant for commanding transmission of the PUSCH, and transmit this to user terminals (for example, UE 2 and UE 3). In addition, the radio base station can report the information about the position of the SRS to the UE 1 using the UL grant or the common PDCCH. Based on the information about the position of the SRS included in the downlink control information, the user terminal exercises control so that the SRS is transmitted before the PUSCH is transmitted.

In addition, by using the downlink control information for scheduling SF # n+1, the radio base station commands PUSCH transmission and SRS transmission to the UE 1 and the UE 2, and, furthermore, commands PUSCH transmission alone to the UE 3. That is, in SF # n+1, user terminals (the UE 1 and UE 2) to transmit both the SRS and the PUSCH and a user terminal (UE 3) to perform PUSCH transmission alone without performing SRS transmission are present. Thus, in SF # n+1, there are no user terminals that perform SRS transmission alone.

In this case, the radio base station commands the user terminals to map the SRS to the last valid symbol (for example, the symbol before the CCA gap) in SF # n+1 (see FIG. 12 and FIG. 13). For example, the radio base station includes predetermined bit information (here, "1") in the downlink control information based on the table of FIG. 11, and transmits this to user terminals (for example, at least the UE 1 and UE 2). As the downlink control information, a UL grant scheduling SF # n+1 and/or a common PDCCH can be used.

For example, the radio base station can include an aperiodic SRS trigger and information about the position of the SRS in a UL grant that commands transmission of the PUSCH, and transmit this to user terminals (for example, the UE 1 and UE 2). Furthermore, the radio base station can transmit a UL grant that does not include the information about the position of the SRS to the UE 3 that does not transmit the SRS. Obviously, a UL grant to include information about the position of the SRS of another user terminal may be transmitted to the UE 3. Based on the information about the position of the SRS included in the downlink control information, the user terminals exercise control so that the SRS is transmitted after the PUSCH is transmitted.

In addition, FIG. 12 and FIG. 13 shows cases where the radio base station commands the UE 1 to the UE 3 to perform PUSCH transmission without performing SRS transmission, by using downlink control information for scheduling SF # n+2. That is, in SF # n+2, no user terminal transmits the SRS.

In this way, by controlling the position to multiplex the SRS in each subframe depending on the SRS transmission method of each user terminal, it is possible to prevent collisions of resources among user terminals. Note that the radio base station may be configured so that, depending on whether or not there is a user terminal that performs SRS transmission alone in a given subframe, the position of another user terminal's SRS is controlled.

Second Example

In the event SRS transmission is made without performing PUSCH transmission, a configuration may be adopted in which the SRS is always allocated before the PUSCH is transmitted. For example, when making SRS transmission without performing PUSCH transmission, a user terminal controls the SRS to be mapped to the UpPTS in the previous subframe of a subframe where SRS transmission is commanded or to the first available valid symbol in a UL subframe.

For example, in the cases illustrated in FIG. 12 and FIG. 13, the UE 1 performs SRS transmission alone in SF # n, so that the UE 1 controls the SRS to be mapped to the UpPTS in SF # n−1 before SF # n or to the first available valid symbol in SF # n. In this case, the radio base station may include information about the position of the SRS at least in the downlink control information for the UE 2 and the UE 3, and not include the information about the position of the SRS in the downlink control information for the UE 1.

In this way, when there is a user terminal that performs SRS transmission without performing PUSCH transmission in a given subframe, a structure is adopted in which the SRS is always allocated before the PUSCH is transmitted. Consequently, it is possible to prevent collisions between the SRS of the user terminal that performs SRS transmission alone and the PUSCHs transmitted from other user terminals.

(Radio Communication System)

Now, the structure of the radio communication system according to the present embodiment will be described below. In this radio communication system, each radio communication method according to the above-described embodiments is employed. Note that the radio communication method according to each embodiment may be used alone or may be used in combination.

Figure 14:
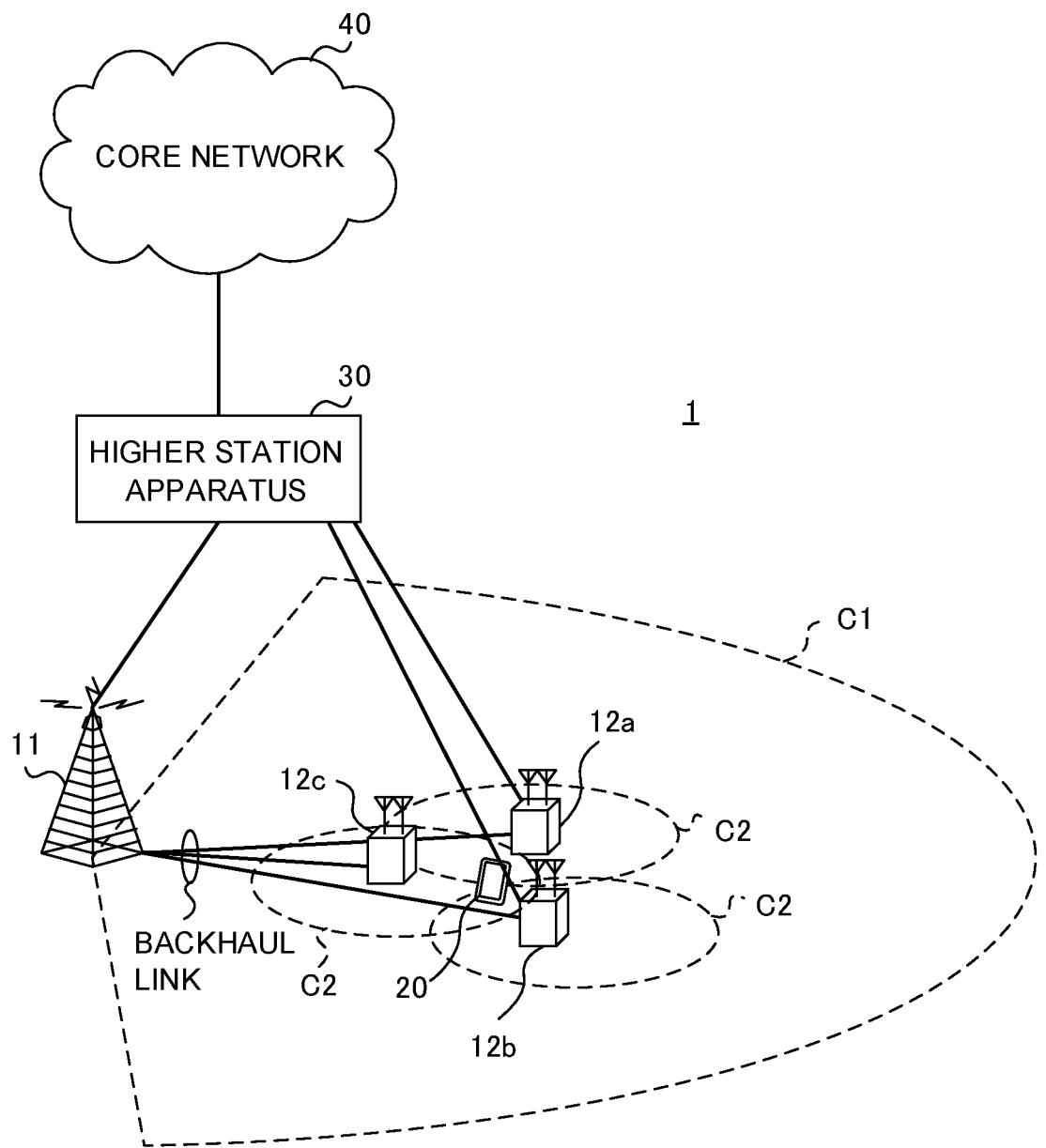
FIG. 14 is a diagram to show an example of a schematic structure of a radio communication system according to the present embodiment.

FIG. 14 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth constitutes 1 unit. Also, the radio communication system 1 has a radio base station (for example, an LTE-U base station) that is capable of using unlicensed bands.

Note that the radio communication system 1 may be referred to as "SUPER 3G," "LTE-A" (LTE-Advanced), "IMT-Advanced," "4G" (4th generation mobile communication system), "5G" (5th generation mobile communication system), "FRA" (Future Radio Access) and so on.

The radio communication system 1 shown in FIG. 14 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the downlink signal configuration) related to a radio base station 12 (which is, for example, an LTE-U base station) that uses an unlicensed band, from the radio base station 11 that uses a licensed band to the user terminals 20. Furthermore, a structure may be employed here in which, when CA is applied between a licensed band and an unlicensed band, 1 radio base station (for example, the radio base station 11) controls the scheduling of licensed band cells and unlicensed band cells.

Note that it is equally possible to adopt a structure in which a user terminal 20 connects with the radio base stations 12, without connecting with the radio base station 11. For example, it is possible to adopt a structure in which a radio base station 12 that uses an unlicensed band establishes a stand-alone connection with a user terminal 20. In this case, the radio base station 12 controls the scheduling of unlicensed band cells.

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of frequency bands for use for the radio base stations is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. Also, it is preferable to configure radio base stations 10 that use the same unlicensed band on a shared basis to be synchronized in time.

The user terminals 20 are terminals that support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. The PDSCH may be referred to as a "downlink data channel." User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. A CFI (Control Format Indicator), which indicates the number of OFDM symbols to use for the PDCCH, is communicated by the PCFICH. HARQ delivery acknowledgement information (ACK/NACK) in response to the PUSCH is communicated by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an "uplink data channel." User data and higher layer control information are communicated by the PUSCH. Also, downlink radio quality information (CQI: Channel Quality Indicator), delivery acknowledgment information (ACK/NACK) and so on are communicated by the PUCCH. By means of the PRACH, random access preambles for establishing connections with cells are communicated.

In the radio communication systems 1, the cell-specific reference signal (CRS), the channel state information reference signal (CSI-RS), the demodulation reference signal (DMRS), the detection and/or measurement reference signal (DRS (Discovery Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal" (UE-specific Reference Signal). Also, the reference signals to be communicated are by no means limited to these.

<Radio Base Station>

Figure 15:
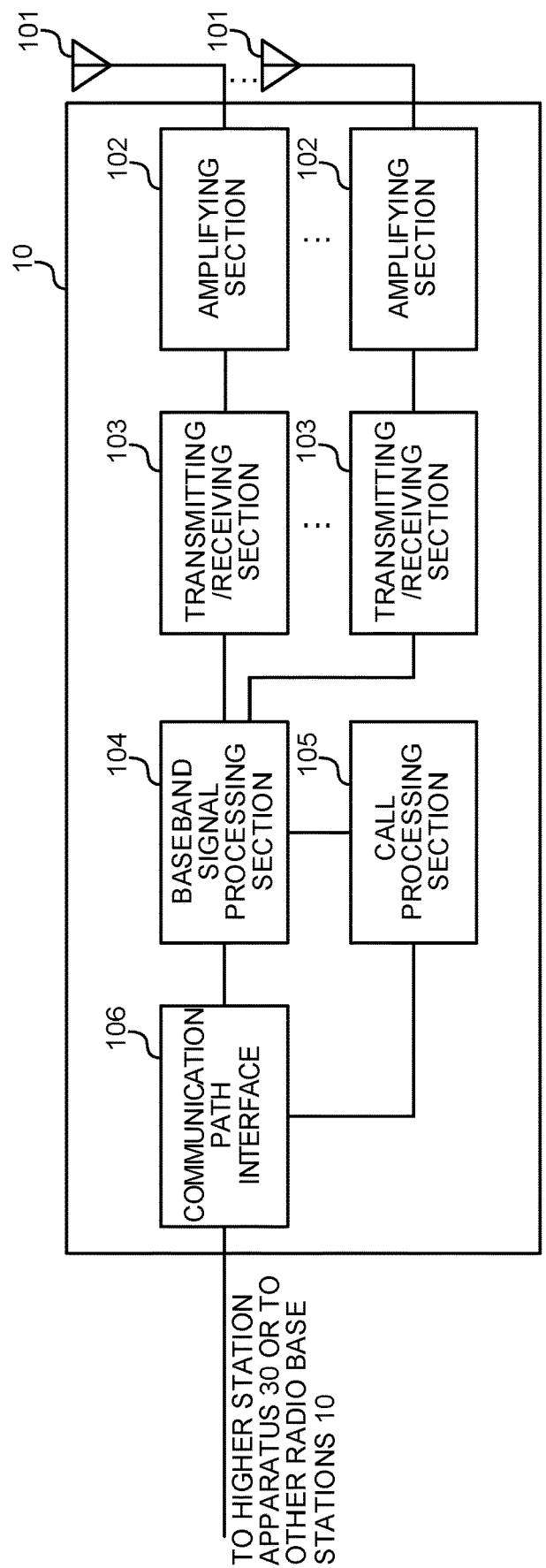
FIG. 15 is a diagram to show an example of an overall structure of a radio base station according to the present embodiment.

FIG. 15 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that 1 or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can transmit and receive uplink and/or downlink (hereinafter "uplink/downlink") signals in unlicensed bands. Note that the transmitting/receiving sections 103 may be capable of transmitting/receiving uplink/downlink signals in licensed bands as well. The transmitting/receiving sections 103 can be constituted by transmitters/receivers, transmitting/receiving circuits or transmitting/receiving apparatus that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface) such as optical fiber, the X2 interface, etc.).

Note that the transmitting/receiving sections 103 transmit downlink signals to a user terminal 20 by using at least an unlicensed band. For example, the transmitting/receiving sections 103 transmit DCI for allocating the PUSCH (UL grant) to the user terminal 20 and DCI for allocating the PDSCH to the user terminal 20 (DL assignment).

To be more specific, the transmitting/receiving sections 103 can transmit DCI that includes information about uplink resource allocation, in which the same resource block (RB) allocation pattern is repeated every predetermined range in the frequency direction. As for the information about uplink resource allocation, it is possible to use bit information that represents predetermined RB allocation selected from multiple RB allocation candidates that are configured in advance. Furthermore, the bit information to represent predetermined RB allocation may be a bitmap that specifies 1 or a plurality of predetermined interlaces selected from multiple interlaces that show allocation of different RBs.

Alternatively, the bit information to represent predetermined RB allocation may be bit information that represents predetermined RB allocation selected from multiple RB allocation candidates that are configured in advance and an offset value in the frequency direction for the predetermined RB allocation.

Also, the transmitting/receiving sections 103 receive uplink signals from the user terminal 20 by using at least an unlicensed band. For example, the transmitting/receiving sections 103 receive the PUSCH that is allocated by the above DCI (UL grant) from the user terminal 20.

In addition, the transmitting/receiving sections 103 may transmit a transmission command (trigger) of a UL reference signal (for example, an A-SRS) and information about the position of the A-SRS, to the user terminal 20. In addition, the transmitting/receiving sections 103 receive the A-SRS transmitted from the user terminal 20.

Figure 16:
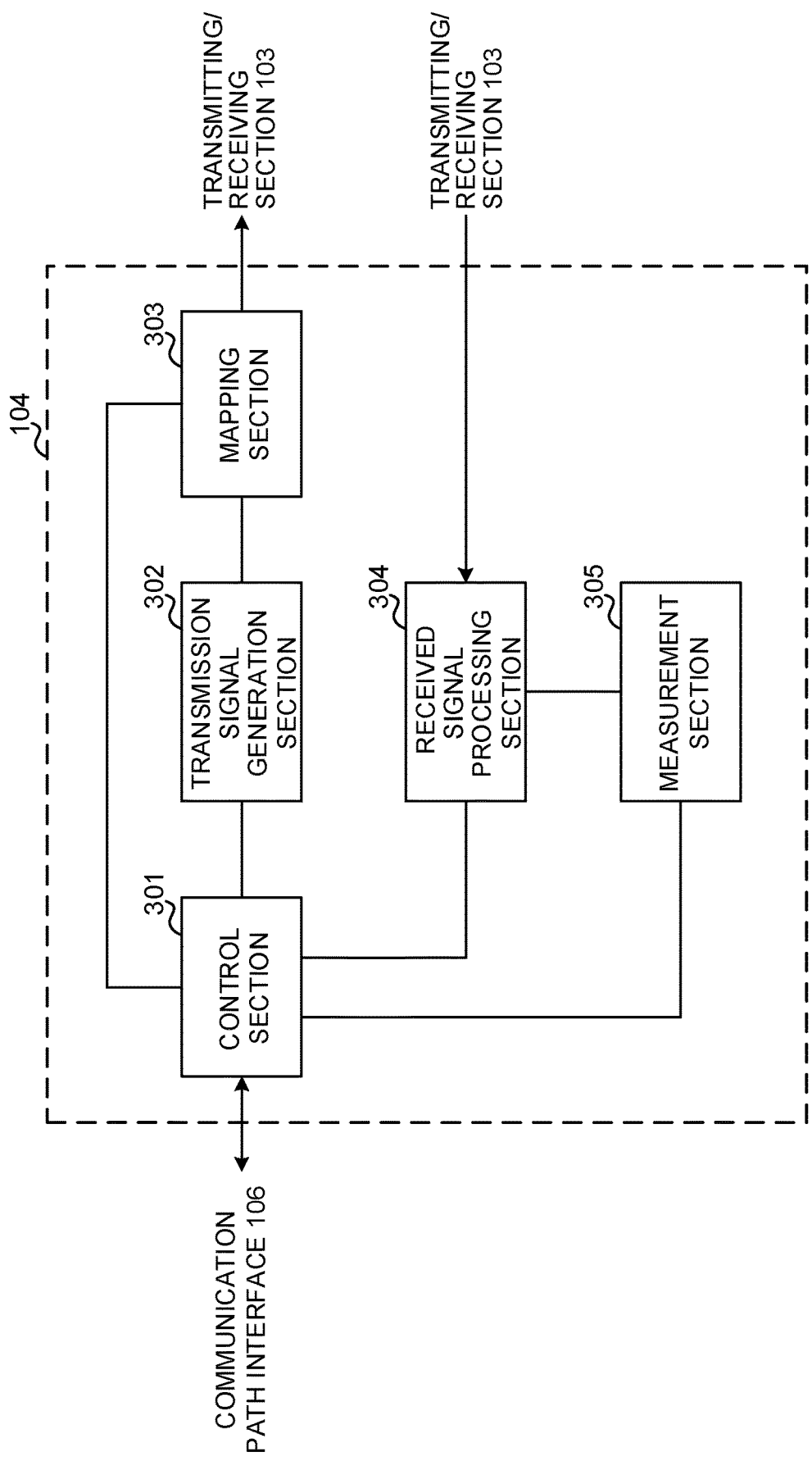
FIG. 16 is a diagram to show an example of a functional structure of a radio base station according to the present embodiment.

FIG. 16 is a diagram to show an example of a functional structure of a radio base station according to the present embodiment. Note that, although FIG. 16 primarily shows functional blocks that pertain to characteristic parts of the present embodiment, the radio base station 10 has other functional blocks that are necessary for radio communication as well. As shown in FIG. 16, the baseband signal processing section 104 at least has a control section (scheduler) 301, a transmission signal generation section 302, a mapping section 303, a received signal processing section 304 and a measurement section 305.

The control section (scheduler) 301 controls the whole of the radio base station 10. Note that, when a licensed band and an unlicensed band are scheduled with 1 control section (scheduler) 301, the control section 301 controls communication in licensed band cells and unlicensed band cells. For the control section 301, a controller, a control circuit or control apparatus that can be described based on common understanding of the technical field to which the present invention pertains can be used.

The control section 301, for example, controls the generation of downlink signals in the transmission signal generation section 302, the allocation of downlink signals by the mapping section 303, and so on. Furthermore, the control section 301 controls the signal receiving processes in the received signal processing section 304, the measurements of signals in the measurement section 305, and so on.

The control section 301 controls the scheduling, generation, mapping, transmission and the like of downlink signals (system information, DCI-transmitting PDCCH/EPDCCH, PDSCH, downlink reference signals, synchronization signals, etc.). Furthermore, the control section 301 controls LBT (listening) by the measurement section 305, and controls the transmission signal generation section 302 and the mapping section 303 to transmit downlink signals depending on the result of LBT. Furthermore, the control section 301 controls the scheduling, reception and the like of uplink signals (PUSCH, PUCCH, PRACH, uplink reference signals, etc.).

To be more specific, the control section 301 controls the allocation of uplink resources so that the same resource block (RB) allocation pattern is repeated every predetermined range in the frequency direction. In addition, the control section 301 controls the transmission signal generation section 302 and the mapping section 303 to transmit DCI that includes information about the above uplink resource allocation (for example, predetermined bit information). Note that this DCI may include a bitmap comprised of bits that correspond to multiple interlaces respectively, or may include bit information that corresponds to predetermined RB mapping patterns that are defined in advance. In addition, the control section 301 can limit the number of predetermined interlaces to be designated by the bitmap to a predetermined number.

In addition, the control section 301 can exercise control so that the position to multiplex the SRS is configured based on the mode of SRS transmission (for example, PUSCH+SRS, PUSCH alone, or SRS alone) in a plurality of user terminals, and information about this SRS multiplexing position is reported to the user terminal (second embodiment).

The transmission signal generation section 302 generates downlink signals based on commands from the control section 301, and outputs these signals to the mapping section 303. The transmission signal generation section 302 can be constituted by a signal generator, a signal generating circuit or signal generating apparatus that can be described based on common understanding of the technical field to which the present invention pertains.

For example, the transmission signal generation section 302 generates DL assignments for reporting information about downlink resource allocation and UL grants for reporting information about uplink resource allocation, based on commands from the control section 301. Also, downlink data signals are subjected to a coding process and a modulation process by using coding rates, modulation schemes and so on, which are determined based on the results of CSI measurements in each user terminal 20 and so on. Also, the transmission signal generation section 302 generates a DRS that includes a PSS, an SSS, a CRS, a CSI-RS and so on.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals transmitted from the user terminals 20. For the received signal processing section 304, a signal processor, a signal processing circuit or signal processing apparatus that can be described based on common understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on common understanding of the technical field to which the present invention pertains.

The measurement section 305 executes LBT in a carrier where LBT is configured (for example, in an unlicensed band) based on a command from the control section 301, and outputs the result of LBT (for example, judgment as to whether the channel state is idle or busy) to the control section 301.

Also, the measurement section 305 may measure the received power (for example, RSRP (Reference Signal Received Power)), the received quality (for example, RSRQ (Reference Signal Received Quality)), the channel states and so on of the received signals. The measurement results may be output to the control section 301.

<User Terminal>

Figure 17:
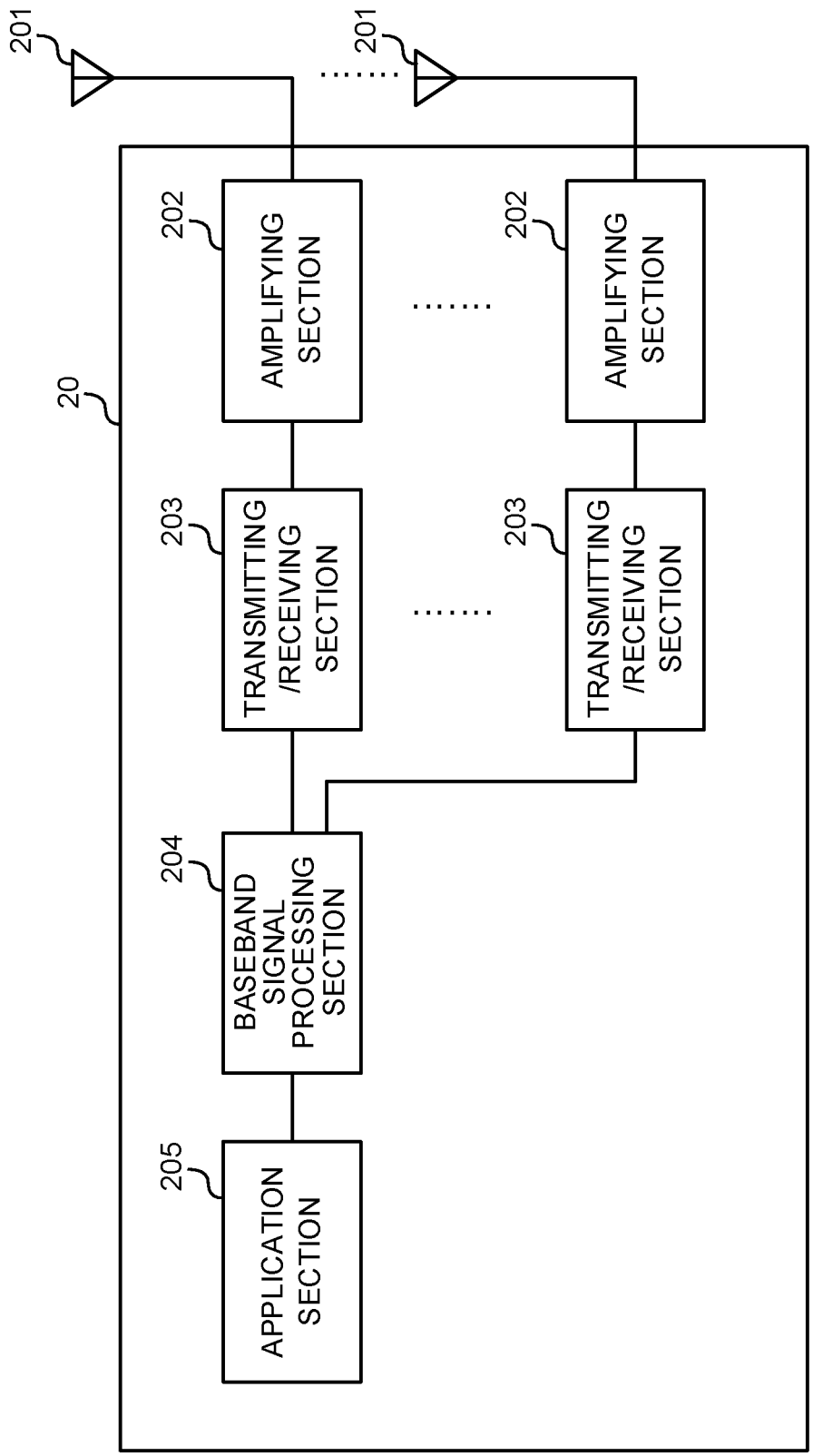
FIG. 17 is a diagram to show an example of an overall structure of a user terminal according to the present embodiment.

FIG. 17 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that 1 or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 are capable of transmitting/receiving uplink/downlink signals in unlicensed bands. Note that the transmitting/receiving sections 203 may be capable of transmitting/receiving uplink/downlink signals in licensed bands as well.

A transmitting/receiving section 203 can be constituted by a transmitters/receiver, a transmitting/receiving circuit or transmitting/receiving apparatus that can be described based on common understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive downlink signals transmitted from the radio base station 10, by using at least an unlicensed band. For example, the transmitting/receiving sections 203 receive downlink control information that includes information about uplink resource allocation, in which the same resource block (RB) allocation pattern is repeated every predetermined range in the frequency direction.

As the information about uplink resource allocation, it is possible to use bit information that represents predetermined RB allocation selected from multiple RB allocation candidates that are configured in advance. Furthermore, as the bit information to represent predetermined RB allocation, it is possible to use a bitmap that designates 1 or a plurality of predetermined interlaces selected from multiple interlaces that represent allocation of different RBs.

Alternatively, as the bit information to represent predetermined RB allocation, bit information that represents predetermined RB allocation selected from multiple RB allocation candidates that are configured in advance, and an offset value in the frequency direction for the predetermined RB allocation, can be used.

Also, the transmitting/receiving sections 203 transmit uplink signals to the radio base station 10 by using at least an unlicensed band. For example, the transmitting/receiving sections 203 may transmit a PUSCH using uplink resources allocated by DCI (UL grant).

In addition, the transmitting/receiving sections 203 receive a transmission command (trigger) of a UL reference signal (for example, A-SRS) and information about the position of the A-SRS. Also, the transmitting/receiving sections 203 can transmit the A-SRS commanded by the A-SRS trigger in the DCI (UL grant) in a predetermined position.

Figure 18:
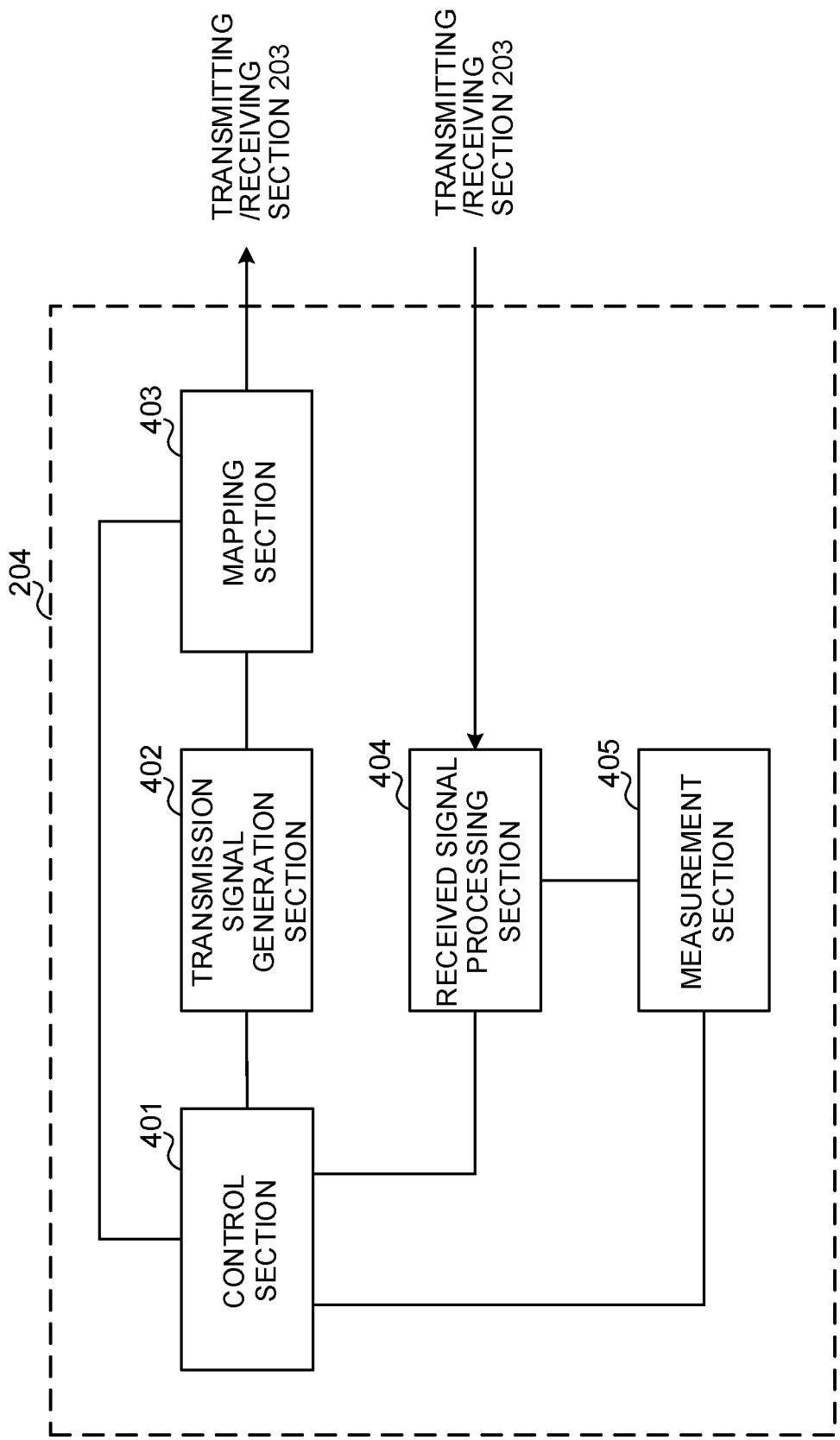
FIG. 18 is a diagram to show an example of a functional structure of a user terminal according to the present embodiment.

FIG. 18 is a diagram to show an example of a functional structure of a user terminal according to the present embodiment. Note that, although FIG. 18 primarily shows functional blocks that pertain to characteristic parts of the present embodiment, the user terminal 20 has other functional blocks that are necessary for radio communication as well. As shown in FIG. 18, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on common understanding of the technical field to which the present invention pertains can be used.

The control section 401, for example, controls the generation of uplink signals in the transmission signal generation section 402, the allocation of signals by the mapping section 403, and so on. Furthermore, the control section 401 controls the receiving processes of downlink signals in the received signal processing section 404, the measurements of signals in the measurement section 405, and so on.

The control section 401 acquires the downlink signals (PDCCH/EPDCCH, PDSCH, downlink reference signals, synchronization signals, etc.) transmitted from the radio base station 10 from the received signal processing section 404. The control section 401 controls the generation of uplink signals (for example, PUCCH, PUSCH, etc.) based on the DCI that is included in the PDCCH/EPDCCH (downlink control signal) and the decoding result of the PDSCH (downlink data signal).

Furthermore, the control section 401 may control the transmission signal generation section 402 and the mapping section 403 to transmit uplink signals based on LBT results acquired in the measurement section 405.

The control section 401 controls the transmission of UL signals based on the allocation information (for example, uplink resource allocation information) in the DCI. For example, the control section 401 controls the allocation of UL resources (for example, an uplink shared channel) based on the bitmap that is included in downlink control information transmitted from the radio base station (see FIG. 5 and FIG. 6).

Alternatively, the control section 401 controls uplink data to be allocated to predetermined UL resources based on the bit information that is transmitted from the radio base station and that represents a predetermined RB mapping pattern and a frequency offset (see FIG. 7 to FIG. 9).

Furthermore, based on the information that is transmitted from the radio base station and that represents the A-SRS trigger and the position of the A-SRS, the control section 401 can control the transmission of the A-SRS (see FIG. 11 to FIG. 13).

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on common understanding of the technical field to which the present invention pertains. For example, when DCI (UL grant) addressed to the user terminal 20 is included in a downlink control signal from the radio base station 10, the transmission signal generation section 402 is commanded by the control section 401 to generate a PUSCH.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on common understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10. The received signal processing section 404 can be constituted by a signal processor, a signal processing circuit or signal processing apparatus that can be described based on common understanding of the technical field to which the present invention pertains. Also, the received signal processing section 404 can constitute the receiving section according to the present invention.

The received signal processing section 404 output the decoded information that is acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on common understanding of the technical field to which the present invention pertains.

The measurement section 405 may execute LBT in a carrier where LBT is configured (for example, in an unlicensed band) based on commands from the control section 401. The measurement section 405 may output the results of LBT (for example, judgments as to whether the channel state is idle or busy) to the control section 401.

Also, the measurement section 405 measures RRM and CSI according to commands from the control section 401. For example, the measurement section 405 measures CSI using measurement reference signals (the CRS, the CSI-RS, the CRS included in the DRS or the CSI-RS for CSI measurements arranged in DRS-transmitting subframes). The measurement results are output to the control section 401 and transmitted from the transmitting/receiving sections 103 using the PUSCH or the PUCCH.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 19:
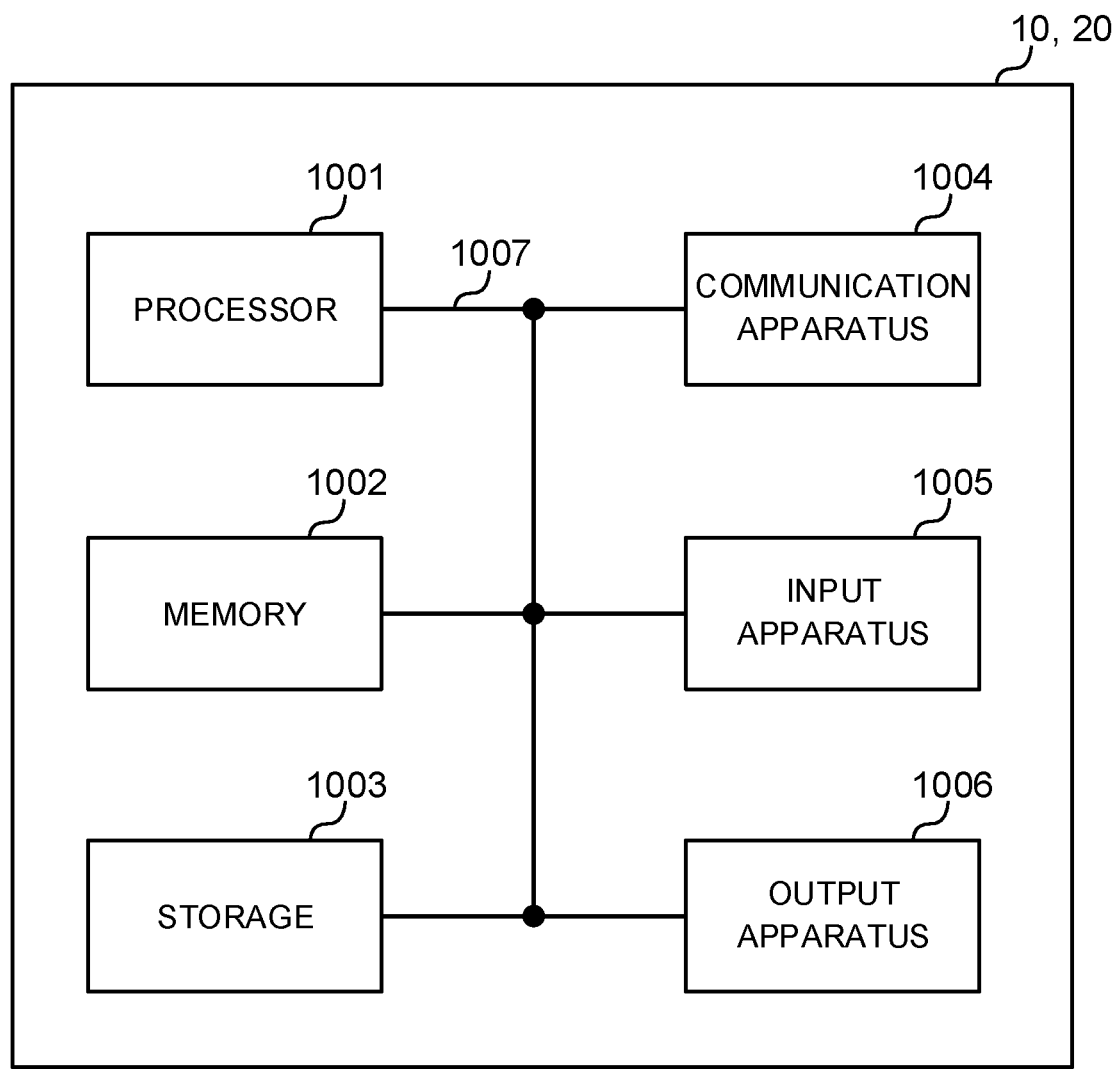
FIG. 19 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 19 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include 1 or more pieces of the apparatus shown in the drawings, or may be designed not to include part of the apparatuses.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal process section 104 (204), call processing section 105 and so on may be implemented by the central processing apparatus 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be stored in the memory 1002 and implemented by a control program that operates on the processor 1001, and other functional blocks may be implemented likewise.

The memory 1002 is a computer-readable recording medium, and may be constituted by, for example, at least 1 of a ROM (Read Only Memory), an EPROM (Erasable Programmable ROM), a RAM (Random Access Memory) and so on. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer-readable recording medium, and is configured with at least 1 of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least 1 of these pieces of hardware.

Note that the terminology used in this specification and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Furthermore, a radio frame may be comprised of 1 or more periods (frames) in the time domain. Each of 1 of multiple periods (frames) constituting a radio frame may be referred to as a "subframe." Furthermore, a subframe may be comprised of 1 or multiple slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. Radio frames, subframes, slots and symbols may be called by other applicable names. For example, 1 subframe may be referred to as a "transmission time interval" (TTI), or a plurality of consecutive subframes may be referred to as a "TTI," and 1 slot may be referred to as a "TTI." That is, a subframe and a TTI may be a subframe (1 ms) in existing LTE, may be a shorter period than 1 ms (for example, 1 to 13 symbols), or may be a longer period than 1 ms.

Here, a TTI refers to the minimum time unit of scheduling in wireless communication, for example. For example, in LTE systems, a radio base station schedules the allocation of radio resources (such as the frequency bandwidth and transmission power that can be used by each user terminal) for each user terminal in TTI units. The definition of TTIs is not limited to this.

A TTI having a time duration of 1 ms may be referred to as a "normal TTI" (TTI in LTE Rel. 8 to 12), a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include 1 or a plurality of consecutive subcarriers in the frequency domain. Also, an RB may include 1 or more symbols in the time domain, and may be 1 slot, 1 subframe or 1 TTI in length. 1 TTI and 1 subframe each may be comprised of 1 or more resource blocks. Note that an RB may be referred to as a "physical resource block" (PRB: Physical RB), a "PRB pair," an "RB pair," or the like.

Furthermore, a resource block may be comprised of 1 or more resource elements (REs). For example, 1 RE may be a radio resource field of 1 subcarrier and 1 symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to a predetermined value, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software, instructions and information may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, a radio base station according to this specification may be read as a user terminal. For example, each example/embodiment of the present invention may be applied to a configuration in which communication between a radio base station and a user terminal is replaced with communication among a plurality of user terminals (D2D: Device-to-Device). In this case, a user terminal 20 may have the above-described functions of a radio base station 10. In addition, wording such as "uplink" and "downlink" may be interpreted as "side." For example, an uplink channel may be interpreted as a side channel.

Likewise, a user terminal in this specification may be interpreted as a radio base station. In this case, the radio base station 10 may have the functions of the user terminal 20 described above.

The examples/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the examples/embodiments described in this specification, and other methods may be used as well. For example, reporting of information may be implemented by using physical layer signaling (for example, DCI (Downlink Control Information), UCI (Uplink Control Information)), higher layer signaling (for example, RRC (Radio Resource Control) signaling, broadcast information (the MIB (Master Information Block) and SIBs (System Information Blocks) and so on) and MAC (Medium Access Control) signaling, other signals or combinations of these. Also, RRC signaling may be referred to as "RRC messages," and can be, for example, an RRC connection setup message, RRC connection reconfiguration message, and so on. Also, MAC signaling may be reported using, for example, MAC control elements (MAC CE (Control Elements)).

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2016-073411, filed on Mar. 31, 2016, including the specification, drawings and abstract, is incorporated herein by reference in its entirety.

The invention claimed is:

1. A terminal comprising:
 a receiver that receives downlink control information including uplink resource allocation information;
 a processor that determines, based on the uplink resource allocation information, a resource block (RB) allocation pattern that is repeated every given-number of resource blocks and an offset in a frequency direction corresponding to the RB allocation pattern; and
 a transmitter that transmits a UL signal by using a plurality of resource blocks that are determined based on the RB allocation pattern and the offset.

2. The terminal according to claim 1, wherein:
 the RB allocation pattern that is repeated every given-number of resource blocks comprises a plurality of predefined RB allocation patterns, and
 the processor determines the RB allocation pattern from among the plurality of predefined RB allocation patterns based on the uplink resource allocation information.

3. The terminal according to claim 2, wherein the plurality of RB allocation patterns includes a RB allocation pattern consisting of unadjacent resource blocks and an RB allocation pattern including adjacent resource blocks.

4. The terminal according to claim 1, wherein the uplink resource allocation information is a bitmap that corresponds to the predetermined number of resource blocks.

5. The terminal according to claim 1, wherein the downlink control information is used for scheduling of an uplink (UL) signal in a cell configured with listening.

6. A radio base station comprising:
a transmitter that transmits downlink control information including uplink resource allocation information based on a resource block (RB) allocation pattern that is repeated every given-number of resource blocks and an offset in a frequency direction corresponding to the RB allocation pattern; and
a receiver that receives a UL signal by using a plurality of resource blocks that are determined based on the RB allocation pattern and the offset.

7. A radio communication method comprising, in a terminal, the steps of:
receiving downlink control information including uplink resource allocation information;
determining, based on the uplink resource allocation information, a resource block (RB) allocation pattern that is repeated every given-number of resource blocks and an offset in a frequency direction corresponding to the RB allocation pattern; and
transmitting a UL signal by using a plurality of resource blocks that are determined based on the RB allocation pattern and the offset.

8. The terminal according to claim 2, wherein the downlink control information is used for scheduling of an uplink (UL) signal in a cell configured with listening.

9. The terminal according to claim 3, wherein the downlink control information is used for scheduling of an uplink (UL) signal in a cell configured with listening.

10. The terminal according to claim 4, wherein the downlink control information is used for scheduling of an uplink (UL) signal in a cell configured with listening.

11. A base station comprising:
a transmitter that transmits downlink control information including uplink resource allocation information to a terminal; and
a receiver that receives a UL signal from the terminal,
wherein, in the terminal, a resource block (RB) allocation pattern that is repeated every given-number of resource blocks and an offset in a frequency direction corresponding to the RB allocation pattern are determined based on the uplink resource allocation information, and the UL signal is transmitted from the terminal by using a plurality of resource blocks that are determined based on the RB allocation pattern and the offset.

* * * * *